US009218427B1

(12) United States Patent
Thompson, III et al.

(10) Patent No.: US 9,218,427 B1
(45) Date of Patent: Dec. 22, 2015

(54) DYNAMIC SEMANTIC MODELS HAVING MULTIPLE INDICES

(71) Applicant: Maana, Inc., Bellevue, WA (US)

(72) Inventors: Ralph Donald Thompson, III, Sammamish, WA (US); Allen Geoffrey Jones, Mercer Island, WA (US); Robert Povey, Redmond, WA (US)

(73) Assignee: Maana, Inc., Bellevue, WA (US)

( * ) Notice: Subject to any disclaimer, the term of this patent is extended or adjusted under 35 U.S.C. 154(b) by 0 days.

(21) Appl. No.: 14/602,192

(22) Filed: Jan. 21, 2015

(51) Int. Cl.
*G06F 17/30* (2006.01)

(52) U.S. Cl.
CPC ...... *G06F 17/3087* (2013.01); *G06F 17/30336* (2013.01)

(58) Field of Classification Search
CPC ................................................ G06F 17/30336
See application file for complete search history.

(56) References Cited

U.S. PATENT DOCUMENTS 8,429,179 B1 * 4/2013 Mirhaji .......................... 707/756
2006/0047649 A1 * 3/2006 Liang ............................... 707/4

* cited by examiner

*Primary Examiner* — James Trujillo
*Assistant Examiner* — Grace Park
(74) *Attorney, Agent, or Firm* — John W. Branch; Lowe Graham Jones PLLC

(57) ABSTRACT

Embodiments are directed towards dynamic semantic models having multiple indices. Source data may be provided to a network computer from at least one separate data source. A raw data graph may be generated from the source data such that the structure of the raw data graph may be based on the structure of the source data. Elements of the raw data graph may be mapped to a concept graph. Concept instances may be generated based on the concept graph, the raw data graph, and the source data. Model-identifiers (MIDs) that correspond to the concept instances may be generated to include at least a path in the concept graph The MID values may be indexed into a plurality of indices based on a content-type of the data associated with the MIDs. In response to a query, a result set may be generated that includes result MIDs.

30 Claims, 25 Drawing Sheets

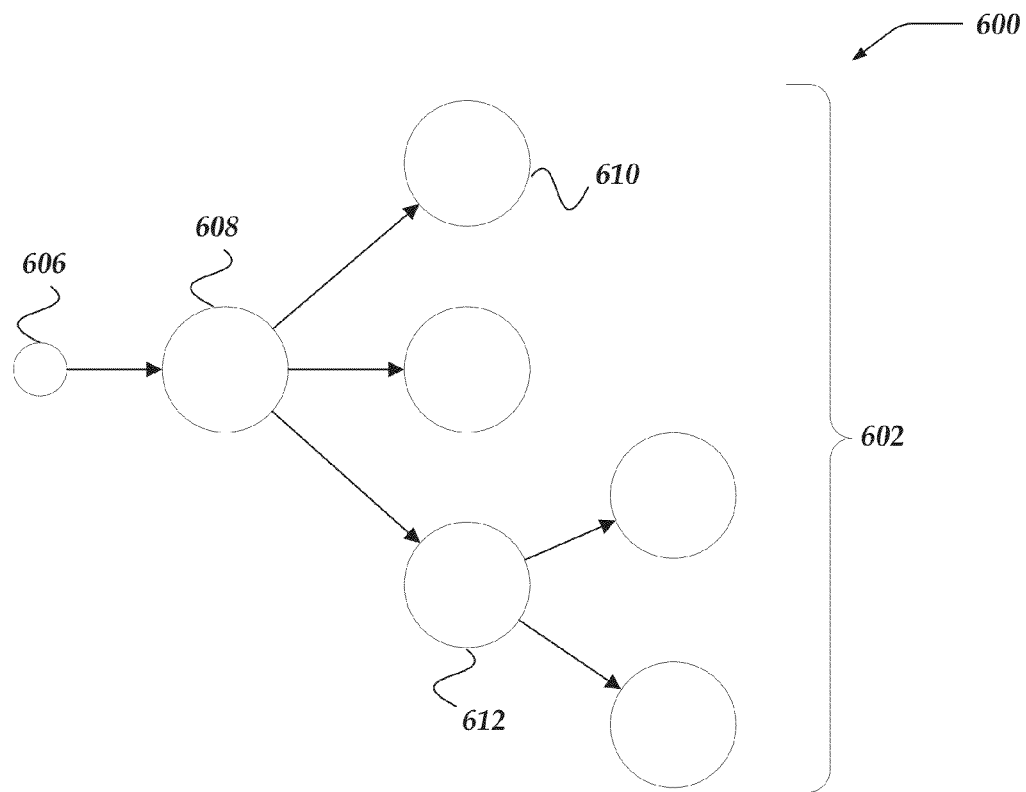
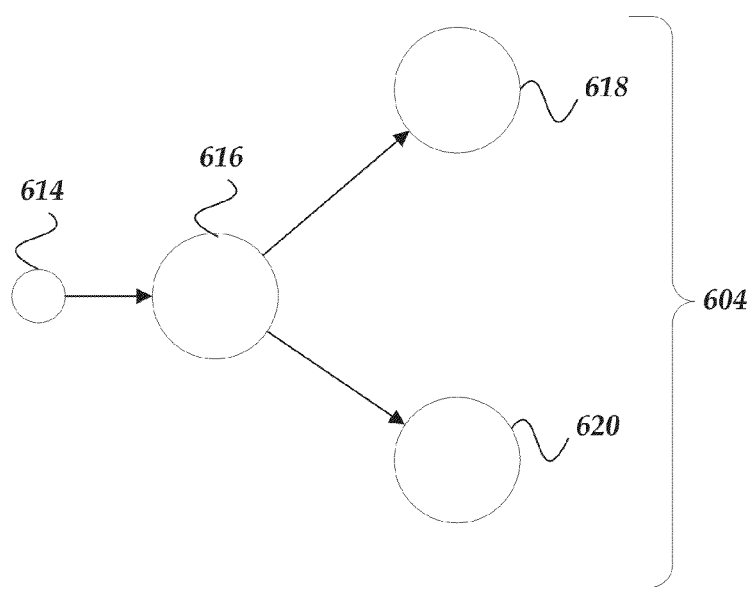
FIG. 6

| Path | Keys | Value |
|---|---|---|
| /MovieDB/Movie/Title | 0:10 | "TheShow" |
| /MovieDB/Movie/Genre | 0:10 | "Comedy" |
| /MovieDB/Movie/Actor/First Name | 0:10 | "John" |
| /MovieDB/Movie/Actor/Last Name | 0:10 | "Smith" |
| /MovieDB/Movie/Actor/Rank | 0:10 | "10" |
| /MovieDB/Movie/Title | 0:20 | "Nighttime" |
| /MovieDB/Movie/Genre | 0:20 | "Horror" |
| /MovieDB/Movie/Actor/First Name | 0:20 | "Sally" |
| /MovieDB/Movie/Actor/Last Name | 0:20 | "Brown" |
| /MovieDB/Movie/Actor/Rank | 0:20:210 | "1" |

FIG. 16

DYNAMIC SEMANTIC MODELS HAVING MULTIPLE INDICES

TECHNICAL FIELD

This invention relates generally to information organization and data modeling and more particularly, to the generation and use and semantic data models in search and analysis of data.

BACKGROUND

Organization are generating and collecting an ever increasing amount of data. Data may be directly or indirectly generated from disparate parts of the organization, such as, consumer activity, manufacturing activity, customer service, quality assurance, or the like. For various reasons, it may be inconvenient for such organizations to effectively utilize their vast collections of data. In some cases the sheer quantity of data may make it difficult to effective utilize the collected data to improve business practices. In other cases, the data collected by different parts of an organization may be stored in different formats, or stored in different locations. Further, employees within the organization may not be aware of the purpose or content of the various data collections stored throughout the organization. Accordingly, there may be many useful insights or correlations hidden in the collected data that are unnoticed or difficult to discover. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein:

FIG. 6 illustrates a logical representation of a portion of a semantic model in accordance with at least one of the various embodiments;

FIG. 16 shows a portion of a forward index in accordance with at least one of the various embodiments;

DESCRIPTION OF VARIOUS EMBODIMENTS

Figure 1:
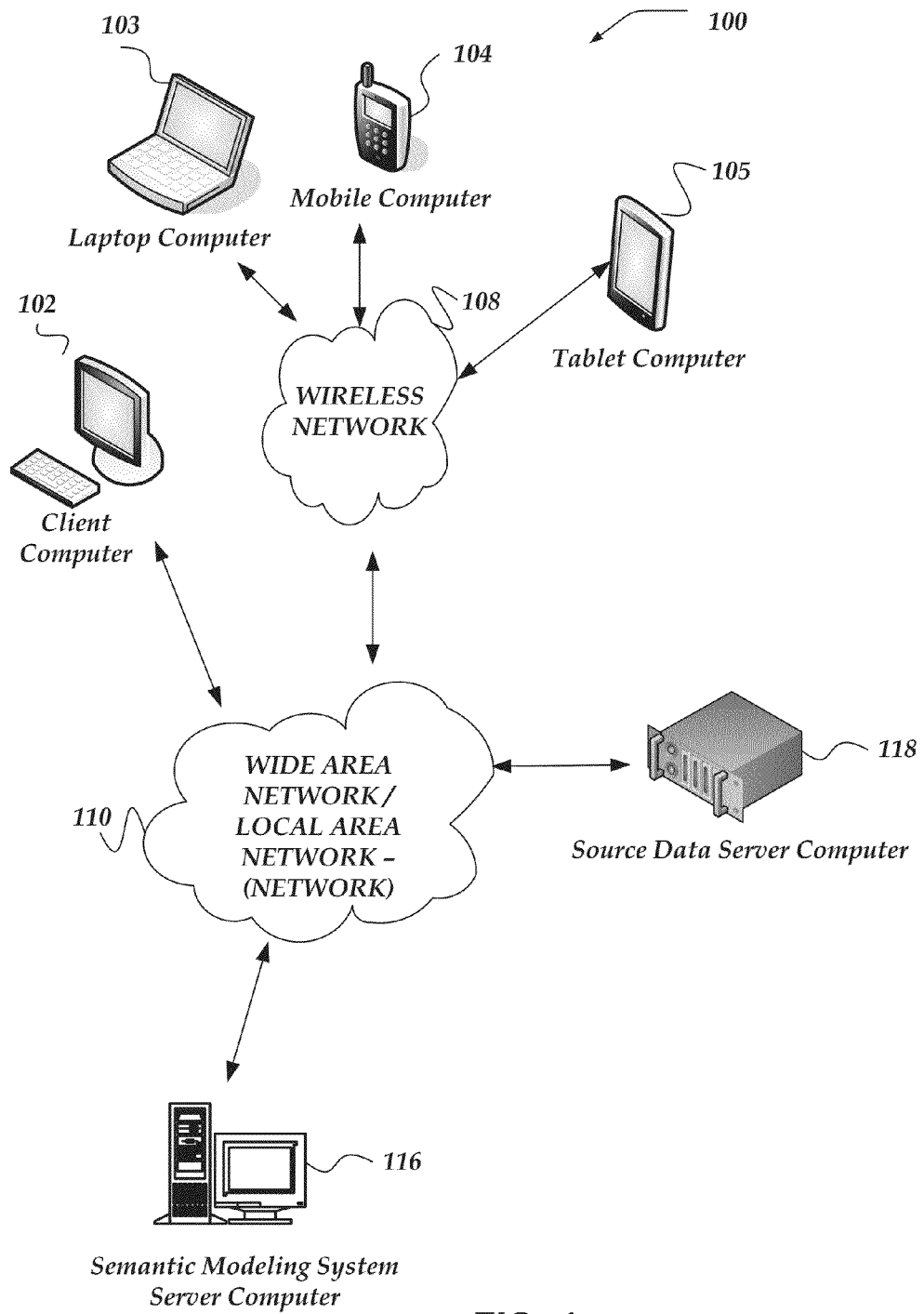
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, "ontology" refers to a naming and definition of the types, properties, and interrelationships of the entities that exist for a particular domain. Ontologies are often defined for particular industries and/or industry activities. In some cases, an ontology for a domain may be employed as standard describing a particular problem domain.

As used herein, "model identifier" refers to a data structure that is employed for identifying an entity in a concept model. Model identifiers (MIDs) comprise structural information as well as value information for an entity. The structural information defines how the entity fits within the structure of the concept model. The structural information may represent a path in a graph that corresponds to structure of the model. MIDs may include one or more keys that determine which entity corresponds to a particular portion of the path. MIDs may also be indexed with a value for the particular instance. See, FIG. 10 and its accompanying description for a detailed discussion of MIDs.

As used herein, "concepts," and "model concepts" refer to the ideas and values in a concept model. Fields from one or more nodes in a raw data graph may be mapped to properties that comprise one or more concepts.

As used herein "concept instance" refers to a particular instance of concept in a concept model. For example, a concept model may include a concept such as Movies. A concept instance represents an individual movie.

As used herein the terms "concept graph," and "concept model" refer to a graph where the nodes represent concepts and the edges represent relationships between the concepts. A concept model may be based on or represent one or more ontologies. The ontologies that define the model may be pre-defined, custom, and/or portions of existing ontologies, or combinations thereof. A concept model represents the structural organization and/or relationship of concepts that may be mapped to fields and/or node in a raw data graph.

As used herein "classifier," "classifiers" refer to components of the semantic modeling system used for processing source data (raw data) that is consumed by the semantic modeling system. In at least one of the various embodiments, classifiers that are registered with an ingestion engine are enabled to process the source data to discover, annotate, and/or extract information from the source data. In at least one of the various embodiments, classifiers that discover information in the source data may be arranged to annotate one or more nodes/fields in a raw data graph.

As used herein "data-type" refers to a type designation for the type of content of a raw field value. Typical examples may include, string, numeric, date-time, text, images, time-date, video, location (geo-spatial), or the like. A content-type may be included in the fields and/or nodes of a raw data graph.

As used herein the terms "classification," and "classification type" refer to an indication of the type of information a raw data field may represent. A raw field value may be classified as being a type of information, such as, person first name, person last name, person name, business name, street address, email address, telephone number, date, time, postal codes, social security numbers, or the like. A classification type represent a higher level concept than a data type.

As used herein the terms "query," and "query string" refer to commands and/or sequences of commands that are used for querying, searching and/or retrieving data from a semantic modeling system. Queries generally produce a result or results depending on the form and structure of the particular query string. Query results may be sorted and grouped based on the structure and form of the query string. In at least one of the various embodiments, query strings may include operators and functions for calculating values based on the stored records, including functions that produce result sets that may include statistics and metrics about the data stored in data repository. Structured Query Language (SQL) is a well-known query language often used to form queries for relational databases. However, the various embodiments are not limited to using SQL-like formatting for query strings. Accordingly, other well-known query languages and/or custom query languages may be employed consistent with what is claimed herein.

As used herein, "n-grams" refers to a contiguous set of alpha-numeric characters (grams) having a fixed number of members (n). N-grams can include words, numbers, combinations letters and numbers, whitespace, combinations of words, or the like, or combination thereof. N-grams may be extracted from string/text values for generating index information. Accordingly, user may generate queries that include n-grams for locating records and/or information that may be associated with one or more of the n-grams included in query.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards dynamic semantic models having multiple indices. In at least one of the various embodiments, source data may be provided to a network computer from at least one separate data source. A raw data graph may be generated from the source data such that the structure of the raw data graph may be based on the structure of the source data. In at least one of the various embodiments, generating the raw data graph may include providing the source data to one or more classifiers that may be identified on a classifier registration list and modifying one or more raw data graph elements based on actions performed by the one or more classifiers.

In at least one of the various embodiments, one or more elements of the raw data graph may be mapped to a concept graph. In at least one of the various embodiments, mapping the one or more elements of the raw data graph to a concept graph may include determining one or more raw data graph elements based on one or more annotations that classifiers may have added to the raw data graph elements. Further, in at least one of the various embodiments, concept instances may be generated based on the concept graph, the raw data graph, and the source data. In some embodiments, model-identifiers (MIDs) that correspond to the one or more concept instances may be generated such that MIDs include at least a path in the concept graph and one or more value keys that may correspond to one or more portions of the source data. In at least one of the various embodiments, the values from the source data that correspond to the MIDs may be indexed into indices that may be selected from a plurality of indices based on a content-type of the source data associated with the MIDs. In some embodiments, indexing the MIDs may include generating one or more index records that may include semantic equivalents of the value of one or more MIDs. Also, in other embodiments, the plurality of indices may include at least one index that is optimized for a content-type of text, at least one index that is optimized for a content-type of time, at least one index that is optimized for a content-type of geo-spatial information, or the like.

Further, in at least one of the various embodiments, in response to a query, a result set may be generated that includes result MIDs based on one or more indices of the plurality of indices such that content-types in the query may be employed to select the indices used to generate the result set.

In at least one of the various embodiments, raw data graph elements may be generated based on the source data such that the value of the raw data graph elements may be absent from the source data. Also, one or more additional queries may be generated based on the result set of a previous query. And, in at least one of the various embodiments, the concept graph may be selected based on one or more ontologies.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, Semantic Modeling System Server Computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, semantic modeling system server computer 116, source data server computer 118, or other computers.

Client computers 102-105 may further be configured to include a client application that enables an end-user to log into an end-user account that may be managed by another computer, such as semantic modeling system server computer 116, source data server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide raw data, configuration information, data curation information, queries, or the like, to semantic modeling system server computer 116. Also, client computers may be arranged to enable users to display reports and/or results provided by semantic modeling system server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, semantic modeling system server computer 116, source data server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of semantic modeling system server computer 116 is described in more detail below in conjunction with FIG. 3. Briefly, however, semantic modeling system server computer 116 includes virtually any network computer capable of generating and/or managing semantic model in network environment.

Although FIG. 1 illustrates semantic modeling system server computer 116, and source data server computer 118, each as a single computer, the innovations and/or embodiments are not so limited. For example, one or more functions of semantic modeling system server computer 116, source data server computer 118, or the like, may be distributed across one or more distinct network computers. Moreover, semantic modeling system server computer 116, source data server computer 118, are not limited to a particular configuration such as the one shown in FIG. 1. Thus, in one embodiment, semantic modeling system server computer 116, or source data server computer 118 may be implemented using a plurality of network computers. In other embodiments, server computers may be implemented using a plurality of network computers in a cluster architecture, a peer-to-peer architecture, or the like. Further, in at least one of the various embodiments, semantic modeling system server computer 116 or source data server computer 118 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
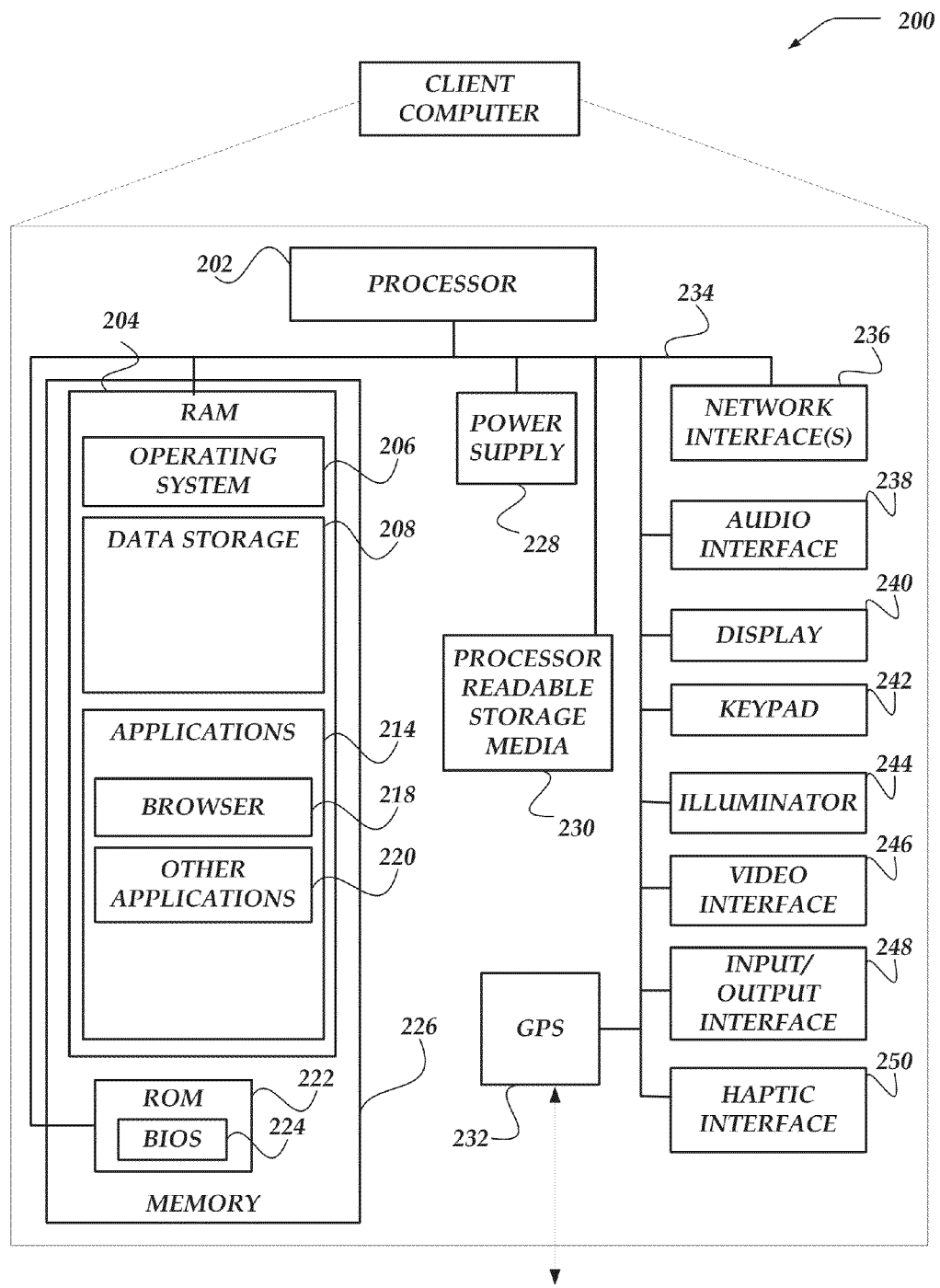
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor device, such as processor 202 in communication with a mass memory 226 via a bus 234. In some embodiments, processor 202 may include one or more central processing units (CPU) and/or one or more processing cores. Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data.

Network data may include, but is not limited to, messages (e.g. SMS, Multimedia Message Service (MMS), instant message (IM), email, and/or other messages), audio, video, and enable telecommunication with another user of another computer. Applications 214 may include, for example, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as semantic modeling system server computer 116, source data server computer 118, or the like, as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
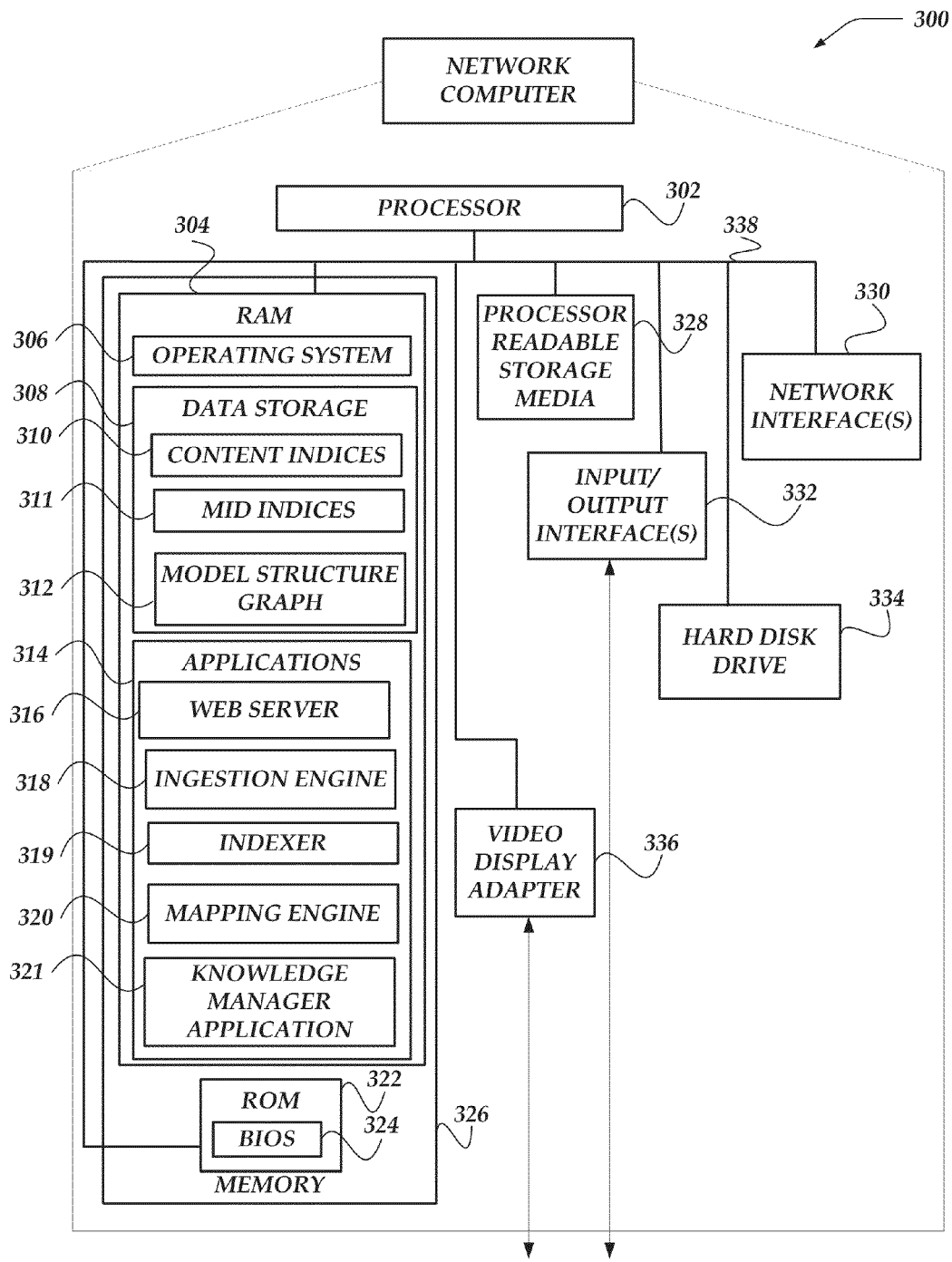
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example semantic modeling system server computer 116, and/or other network computers, such as, source data server computer 118.

Network computer 300 includes one or more processor devices, such as, processor 302. Also, network computer 300 includes processor readable storage media 328, network interface unit 330, an input/output interface 332, hard disk drive 334, video display adapter 336, and memory 326, all in communication with each other via bus 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor device, such as processor 302 to execute and perform actions. In one embodiment, at least some of data store 308 might also be stored on another component of network computer 300, including, but not limited to processor-readable storage media 328, hard disk drive 334, or the like.

Further, in at least one of the various embodiments, a network computer arranged as a source data computer, such as, source data server computer 118 may include one or more hard drives, optical drives, solid state storage drives or the like, for storing the raw and/or source data that may be processed by semantic modeling system server computer 116.

Data storage 308 may include multiple content indices 310. In at least one of the various embodiments, content indices 310 may include information for various content indices such as n-gram indices, temporal indices, geospatial indices, or the like. Also, in at least one of the various embodiments, data storage 308 may include model identity (MID) indices 311 for storing join indices, inverted MID indices, and other helper indices. Further, in at least one of the various embodiments, data storage 308 may include model graphs 312 for representing the organization and/or structure of concepts and/or information that may be modeled.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, web server 316, ingestion engine 318, indexer application 319, mapping engine 320, knowledge manager application 321, or the like.

Web server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical Architecture

Figure 4:
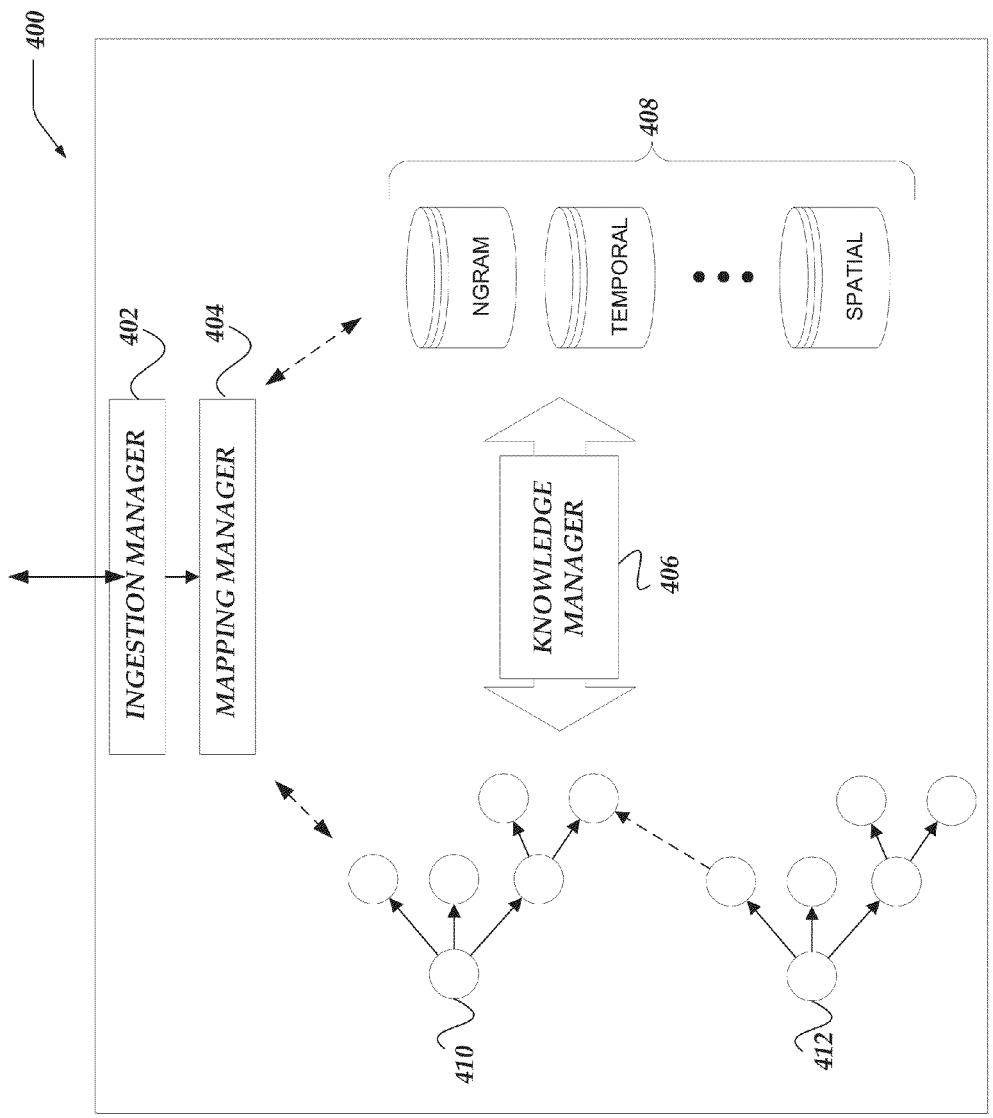
FIG. 4 shows a logical schematic of a portion of a semantic modeling system in accordance with at least one of the various embodiments.

FIG. 4 shows a logical schematic of a portion of semantic modeling system 400 in accordance with at least one of the various embodiments. Briefly, in at least one of the various embodiments, system 400 may include ingestion manager 402, mapping manager 404, knowledge manager 406, multiple indices 408, model graph 410, and model graph 412. In at least one of the various embodiments, other/additional parts of system 400 not shown in FIG. 4 may include raw data, raw data graphs, MID indices, join indices, inverted/reverse indices, or the like.

In at least one of the various embodiments, ingestion manager 402 may be arranged to perform actions to process source data as it is added to the system. Data may be provided from various sources, including, files stored on local or remote file systems, streaming data, one or more source data computers, such as, source data server computer 118, or the like.

In at least one of the various embodiments, ingestion manager 402 may be arranged to process source data to produce one or more raw data graphs based on the inherent structure of the raw the data.

In at least one of the various embodiments, mapping manager 404 may be arranged to generate and/or facilitate the generation of concept graphs such as, concept graph 410 and/or concept graph 412. In at least one of the various embodiments, mapping manager 404 may be arranged to map raw data nodes and/or data fields produced by ingestion manager 402 to concept nodes in one or more concept models. Further, in at least one of the various embodiments, mapping manager 404 may be arranged to generate one or more MIDs that may be indexed in indices, such as, indices 408.

In at least one of the various embodiments, there may be multiple indices that may be employed for indexing MIDs. The particular index that may be selected for indexing a MID may depend on the content type of the source data. For example: content for MIDs representing text/character values may be indexed using n-gram indices; MIDs representing time-based values may be indexed in temporal indices; or MIDs representing geographical/geo-spatial values may be indexed in geo-spatial indices. Accordingly, in at least one of the various embodiments, different type of data may be indexed using indices that may be optimized for the content-types of the values associated with the MID.

In at least one of the various embodiments, various actions such as responding to queries or data mining may be performed by knowledge manager 406. In at least one of the various embodiments, knowledge manager 406 may be arranged to generate result sets in response to queries or other commands provided by users or remote applications. Further, in at least one of the various embodiments, users may be enabled to provide queries and other commands using a graphical user-interface and/or web page.

Figure 5A:
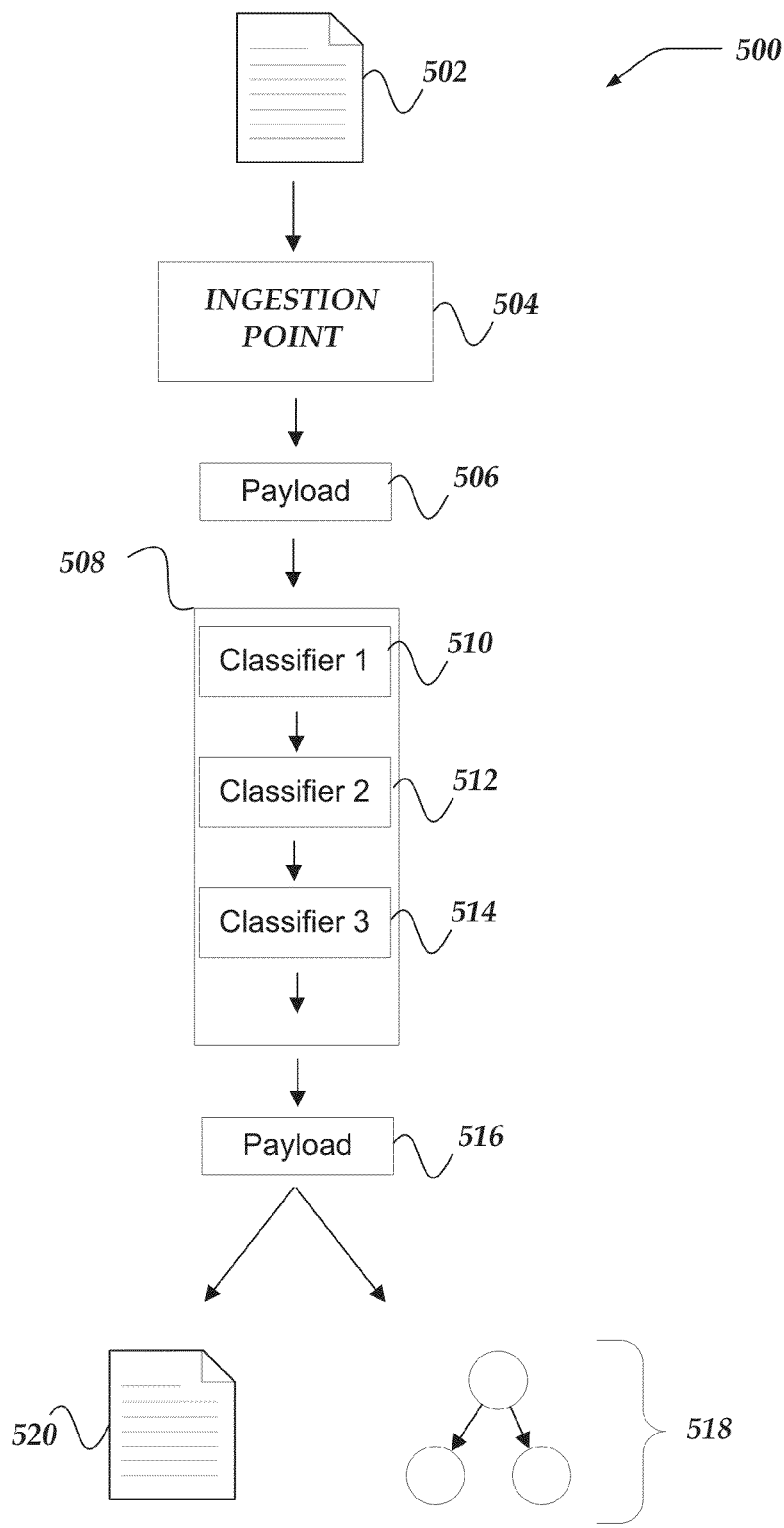
FIGS. 5A and 5B show a logical schematic of a portion of an ingestion engine in accordance with at least one of the various embodiments.

FIG. 5A shows a logical schematic of a portion of ingestion engine 500 in accordance with at least one of the various embodiments. As discussed briefly above, ingestion engines, such as, ingestion engine 500 may be arranged to process source data records to generate raw data graphs that represent the content structure of the source data.

In at least one of the various embodiments, ingestion engine 500 may be provided source data represented by data record 502. In at least one of the various embodiments, an ingestion engine may ingest data records form a variety of sources. Further, the data records may be provided in different formats, such as, XML, HTML, office application documents, databased export files, database result sets, log files, unstructured data, CSV files, data streams, image files, video files, video streams, or the like.

In at least one of the various embodiments, as each source data record enters ingestion engine 500 it may be provided to an ingestion point, such as, ingestion point 504. In at least one of the various embodiments, ingestion point 504 represents the logical entry point for source data to enter the system. In at least one of the various embodiments, ingestion point 504 may be arranged to perform actions that include generating a payload object that may be a logical envelope for data record 502 as it is processed by ingestion engine 500.

In at least one of the various embodiments, source data an ingestion engine may generate a raw data graph based on the structure of source data. In at least one of the various embodiments, if the source data is provided using an XML file, the ingestion engine may generate a raw data graph based on the structure embedded in the XML file. Also, in at least one of the various embodiments, if the source data is a database export file, the shape of the raw data graph may be generated from the database schema that is associated with the database export file.

In at least one of the various embodiments, payload 506 may be comprised of XML, JSON, or other structured data formats, including data structure such as, lists, hashes, objects, or the like. Initially, in at least one of the various embodiments, payload 506 may include minimal information, such as, an identifier, a time-stamp, the source data record, a reference to the source data record, or the like.

In at least one of the various embodiments, payload 506 may be provided to a classification pipeline, such as, classification pipeline 508. In at least one of the various embodiments, classification pipeline 508 may include one or more classifiers, such as, classifier 510, classifier 512, classifier 514, and so on. In at least one of the various embodiments, pipeline 508 may include the one or more classifiers that are registered for the pending ingestion process. For example, in at least one of the various embodiments, pipeline 508 may be arranged to select the one or more classifiers from a registration list, registration database, or other configuration information.

Further, in at least one of the various embodiments, pipeline 508 may be arranged to provide payload 506 to each registered classifier in turn. In at least one of the various embodiments, the particular order in which the classifiers operate on payload 506 may be determined based on a rank order associated with each classifier. For example, in at least one of the various embodiments, the order that the classifiers are listed in a registration list may correspond to the order that they are enabled to operate on payload 506. In other embodiments, classifiers may be assigned a rank, or priority value by a user or in configuration information. In at least one of the various embodiments, in some cases one or more classifiers may be defined as eligible for running in parallel with each other.

In at least one of the various embodiments, classifiers may be arranged to receive payload 506 and perform one or more actions for classifying source data record 502. In at least one of the various embodiments, classifiers may comprise one or more scripts, policies, rules, functions or processes for analyzing and/or classifying the information included in the payload.

Also, in at least one of the various embodiments, a classifier may modify the payload by adding some or all of the results (if any) generated or determined during its turn at processing the payload. Accordingly, in at least one of the various embodiments, subsequently executed classifiers may be arranged to recognize, process, and/or react to modifications to the payload that may be made by one or more of the upstream classifiers.

In at least one of the various embodiments, an individual classifier may be comprised of processor readable instructions and/or configuration information that may be arranged to recognize and extract content for particular types of data records.

In at least one of the various embodiments, classifiers may be arranged to examine the content of the data record to determine one or more entities and/or resources that may be embedded or included in the data record. In at least one of the various embodiments, classifiers may include heuristic tests that may be made up of one or more, of pattern matches, content matches, or the like. For example, in at least one of the various embodiments, a classifier, such as, classifier 512, may be configured to identify first name and last name information from string content having a particular format. In this example, classifier 512 may include one or more pattern matching expressions (e.g., regular expressions) for identifying information in the incoming record and/or payload that may correspond a person's first name and last name. In at least one of the various embodiments, one or more well-known pattern matching and/or data extraction techniques may be employed with the particular patterns and extractors adapted to the formatting and content of the source record.

Accordingly, in some embodiments, the configuration of a classifier may be adapted to one or more characteristics of the data record, such as, a type of data record (e.g., patient record, web-server log file, finance transaction logs, and so on), a format of the data records (e.g., XML, CSV, JSON, HTML, or the like), source of the data records, or the like.

In at least one of the various embodiments, payload 516 represents the payload after each classifier in pipeline 508 has had an opportunity to examine and process the data record and add its result information, if any. For example, in this example, payload 516 may include the results produced by classifier 510, classifier 512, and classifier 514. In some embodiments, such results may be include annotations that may be included in a raw data graph. For example, classifiers that are arranged for identifying dates, person names, telephone numbers, email addresses, physical addresses, or the like, may annotate the fields of raw data graphs node accordingly. In some embodiments, classifiers may include a confidence score that corresponds with their annotation. For example, a classifier that is arranged for identifying fields that represent email addresses include a confidence score (e.g., 30%, 80%, or the like) that indicates how well the raw data field matched to conditions of the classifier.

In at least one of the various embodiments, sending data record 502 through pipeline 508 may produce information corresponding to a raw data graph portion, such as raw data graph portion 518 that represents the raw data nodes and fields that were determined by the ingestion engine and/or classifiers.

In at least one of the various embodiments, data record 520 illustrates that the source data may be preserved in an unmodified state. In at least one of the various embodiments, the source data record may be stored in its original state. This at least enables the same data to be reprocessed at a later date. Also, it enables users to review/access the original source data record as needed.

Figure 5B:
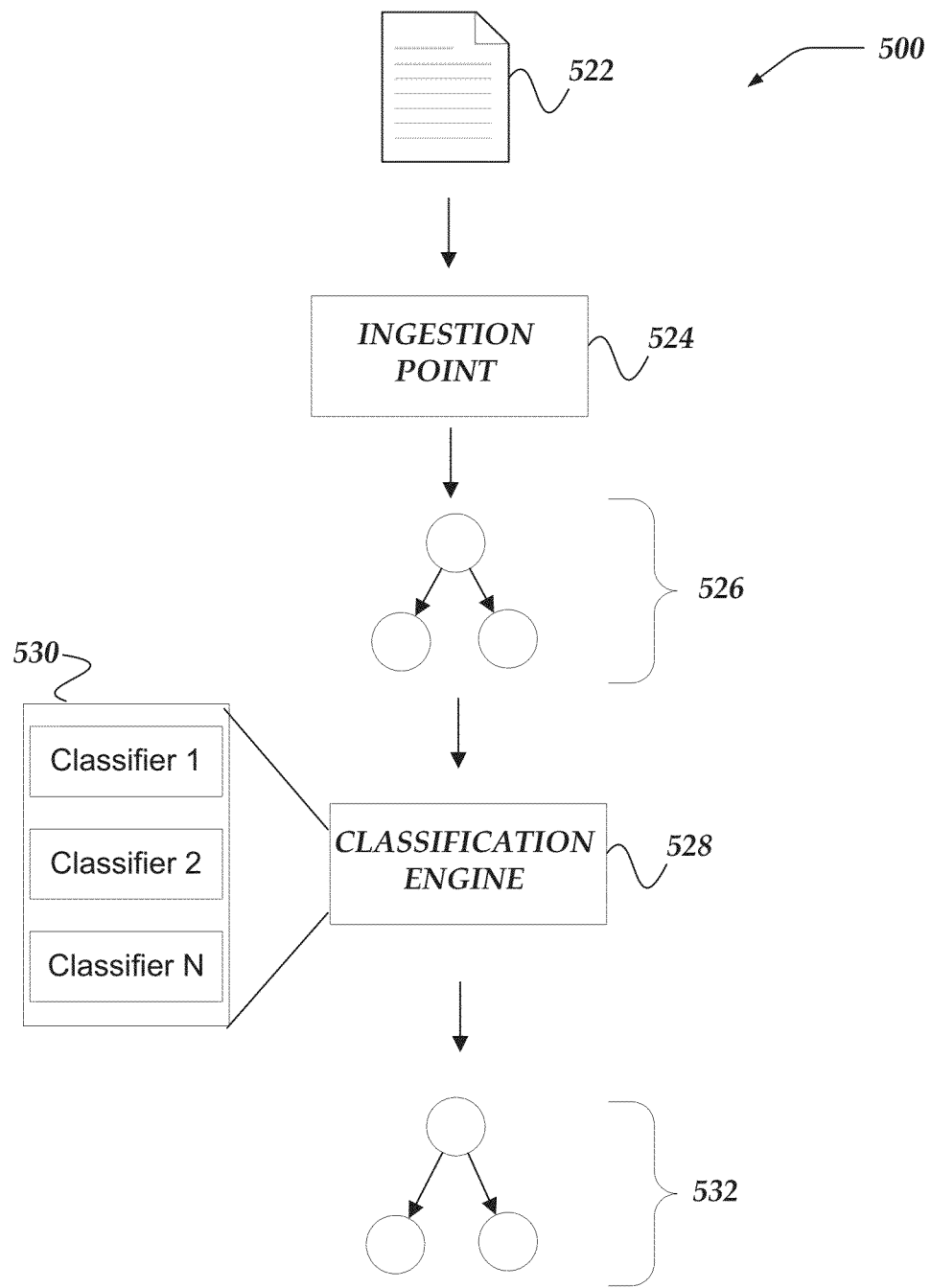

FIG. 5B shows a logical schematic of a portion of ingestion engine 500 in accordance with at least one of the various embodiments. In at least one of the various embodiments, raw data and/or source data such as data 522 may be ingestion at an ingestion point, such as, ingestion point 524. In at least one of the various embodiments, ingestion point 524 may be provided the raw data (as described above) and process to produce an initial raw data graph, such as, raw data graph 526. In at least one of the various embodiments, the structure of raw data graph 526 may initially be determined based on the structure of the source data that is ingested.

In at least one of the various embodiments, if the source data is successfully ingested, it may next be classified. In at least one of the various embodiments, a classification engine, such as, classification engine 528 may be arranged to execute one or more classifiers, such as, classifiers 530.

In at least one of the various embodiments, the one or more classifiers may be registered with the ingestion engine. However, in some embodiments, they may be arranged to execute after the source data has been initially ingested. In at least one of the various embodiments, classifiers 502 may be arranged to perform similar as those described for FIG. 5A. However, in some embodiments, classifiers 530 may be arranged to execute directly on the raw data graph rather being executed using a pipeline with payload architecture.

Accordingly, in at least one of the various embodiments, if classification engine 528 finishes its initial run, raw data graph 532 may be generated. Raw data graph 532 may represent raw data graph 526 as modified by classifiers 530.

FIG. 6 illustrates a logical representation of a portion of semantic modeling system 600 in accordance with at least one of the various embodiments. As discussed above, the ingestion engine may produce a raw data graph from the source data for mapping to one or more concept models. Accordingly, one or more concept model graphs may be employed to represent the structure of the concept model.

In at least one of the various embodiments, concept graph 602 and concept graph 604 represent the structure of the concept models that are mapped to fields and nodes of a raw data graph that was produced during the ingestion process. In at least one of the various embodiments, the structure of relationships of the concepts may be logically represented as a graph of nodes and edges. Nodes may represent concepts and the edges may represent relationships between concepts. In at least one of the various embodiments, some concepts may be represented by separate concept model graphs each having separate root nodes, such as, root node 606 and root node 614. The particular shape of a concept model graph may be determined by an ontology that may define the concepts and their relationships. Nodes and fields from a raw data graph may be mapped to concepts and/or properties in the concept models. In at least one of the various embodiments, multiple concept model graphs having different arrangements (shapes) may be generated from the same raw data graph and/or source data depending on how the raw data may be mapped to concept model.

For example, if data records from a movie database were the source data, concept graph 602 may be arranged such that node 608 represents movies, node 610 represents the release date of a movie, and node 612 represents actors that may be in a movie. Accordingly, fields from a raw data model may be mapped to the concepts in concept graph 602. Additional concepts/entities not shown here associated with movies may flesh out the concept graph, such as, production company, locations, national origin, language, producers, directors, or the like.

As mentioned, in at least one of the various embodiments, concept graph 602 represents just one particular shape that ingested movie database information may be modeled. For example, concept graph 604 may be arranged to represent people. Accordingly, node 616 may represent persons, with other nodes representing features of the persons, such as, node 618 may represent the first name of a person, and node 620 may represent the last name of a person, and so on. Thus, as shown in this example, one or more different concept graphs having different structural shapes may be based on and/or mapped to the same ingested source data depending on the configuration of the ontologies of the concept models and/or the mapping processes employed.

Figure 7:
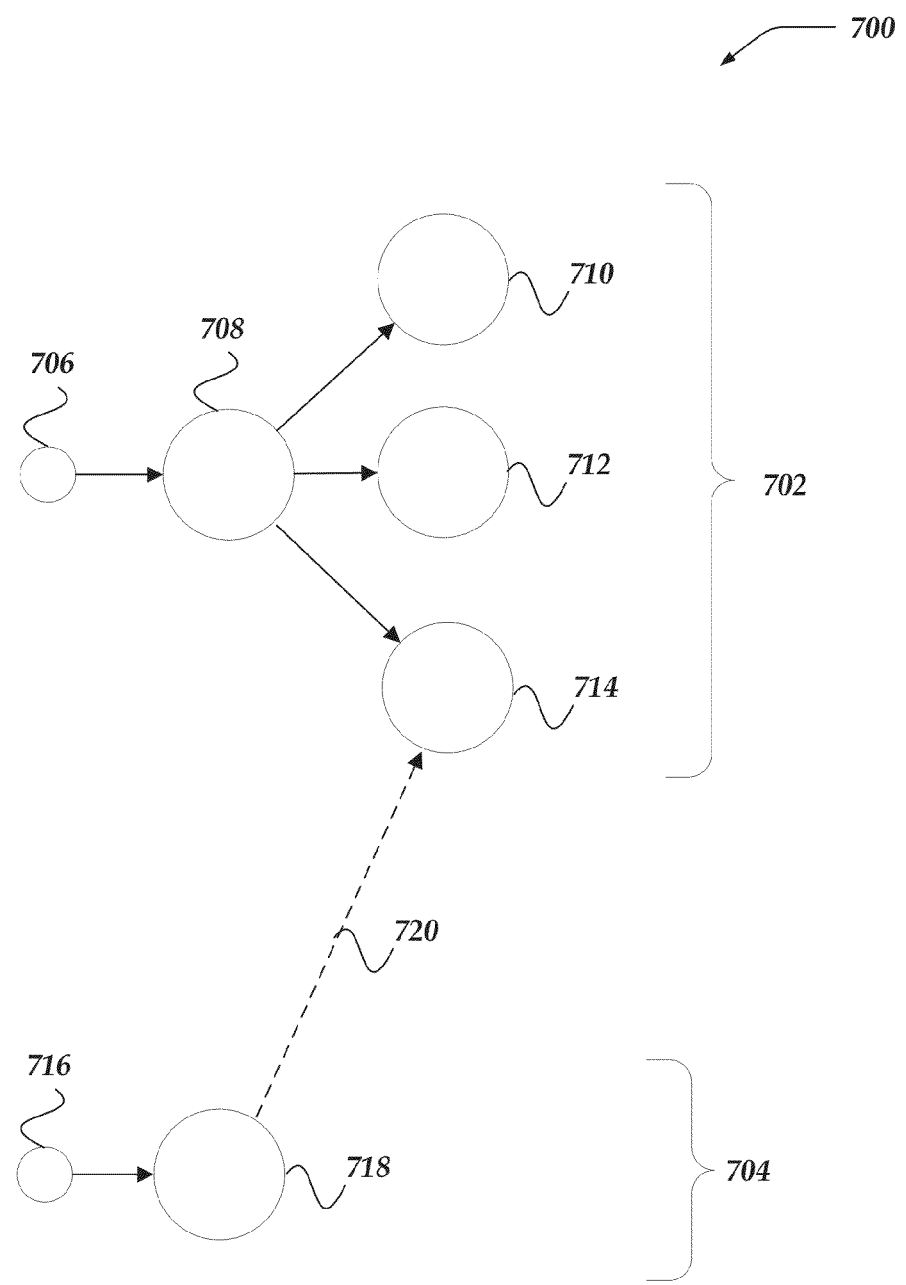
FIG. 7 illustrates a logical representation of a portion of a semantic model showing a referential relationship in accordance with at least one of the various embodiments.

FIG. 7 illustrates a logical representation of a portion of semantic model 700 showing a referential relationship between two portions of the model in accordance with at least one of the various embodiments. In at least one of the various embodiments, a mapping engine may be arranged to generate multiple concept model graphs from the same source data. For example, if a movie database is being ingested, information in the raw data may be mapped to concepts related to the movies in the database. Accordingly, from root 706, the mapping engine may map information from the raw data to a movie concept represented by movie node 708, and other concepts (properties of a movie concept) shown as child nodes, such as, movie title (node 710), movie release date (node 712), and actor (node 712). Note, in some embodiments, additional nodes not shown here may be included to represent other concepts, such as, producer, director, assistant director, and so on. They are omitted here for brevity and clarity. However, one of the ordinary skill the art will appreciate that additional concepts may be used in a semantic model for a movie database.

In at least one of the various embodiments, a concept in one model may be arranged to reference a concept that may be part of another semantic model. Accordingly, for example, in addition to generating a concept model for movie, the system may be arranged to generate a concept model that represents persons in general. Naturally, actors from the movie information, would qualify as persons and may be represented in the person model as well as in the movie model. In the example shown in FIG. 7, concept graph 704 includes root node 716 and person concept node 718. Further, since the actor concepts in concept graph 702 are also persons, edge 720 represents that the values for a person concept (person node 718) may come from values for an actor concept (node 714). Also, in at least one of the various embodiments, there may be more than one reference relationship for defining the values for person concepts (node 718). For example, if the movie model (represented by model graph 702) included a director concept node (not shown), there may be an additional reference from person concept node 718 to the director concept node (not shown) in model graph 702.

Thus, in at least one of the various embodiments, a mapping process may identify or create relationship for concepts in one concept model to concepts in other concept models. For example, in this example, different concepts in different models having properties, such as, first name, last name, or the like, may be modeled using person concept model as well as in the movie concept model.

Figure 8:
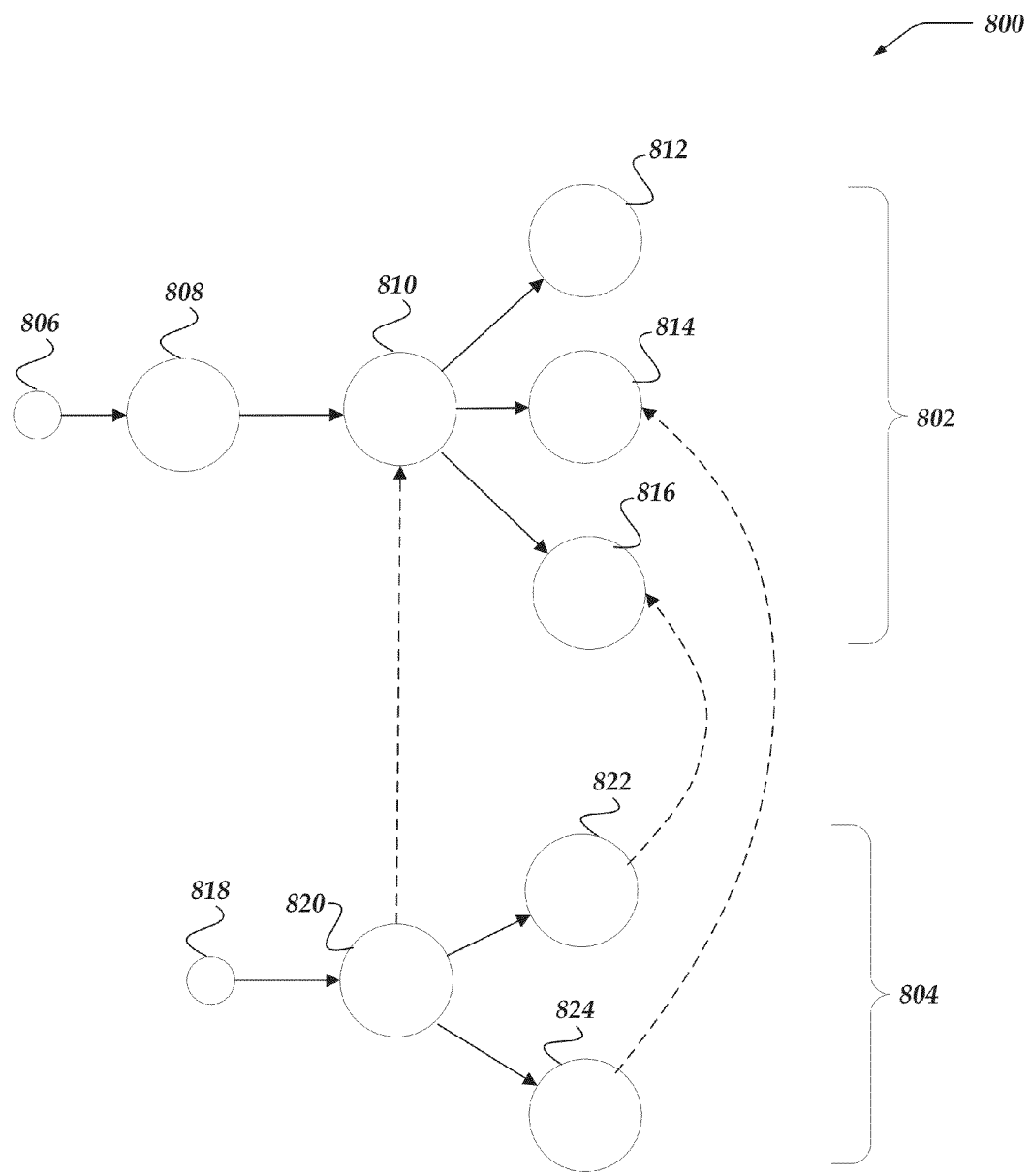
FIG. 8 illustrates a logical representation of a portion of a semantic model showing a referential relationship in accordance with at least one of the various embodiments.

FIG. 8 illustrates a logical representation of a portion of semantic model 800 showing a referential relationships in accordance with at least one of the various embodiments. In at least one of the various embodiments, in addition to generating relationships between concepts in different concept models, the mapping engine may include processes that shape information from referenced concepts to suit the needs of another concept model that referencing them. For example, in at least one of the various embodiments, concept model 802, comprises, root node 806, movies concept 808, actor concept 810, credits ranking concept 812, first name concept 814, and last name concept 816. Whereas model 804 which represent a person model, comprises, root node 818, person concept 820, first name concept and last name concept 824. As discussed above, a mapping process may be arranged to reference actor concepts in model 804, since actors are persons. However, in this example, in at least one of the various embodiments, since concept model 804 represents persons in general, it may not be appropriate for all of the information for associated with an actor concept to be included in the person concept in concept model 804. For example, actor concept 810 may be arranged to include credit rank concept 812 for representing the rank order placement of an actor in a movie's credits. Actor's that are the most popular or most important for a movie may have a higher rank than a less popular actor's rank. In at least one of the various embodiments, even though this type of information may be relevant for actors it may be unlikely to be relevant for persons in general. Accordingly, in this example, person concept 820 may be arranged to reference actor concept 810, but person concept 820 omits the concepts/properties, such as, credit rank concept 812 that is part of actor concept 810.

Figure 9:
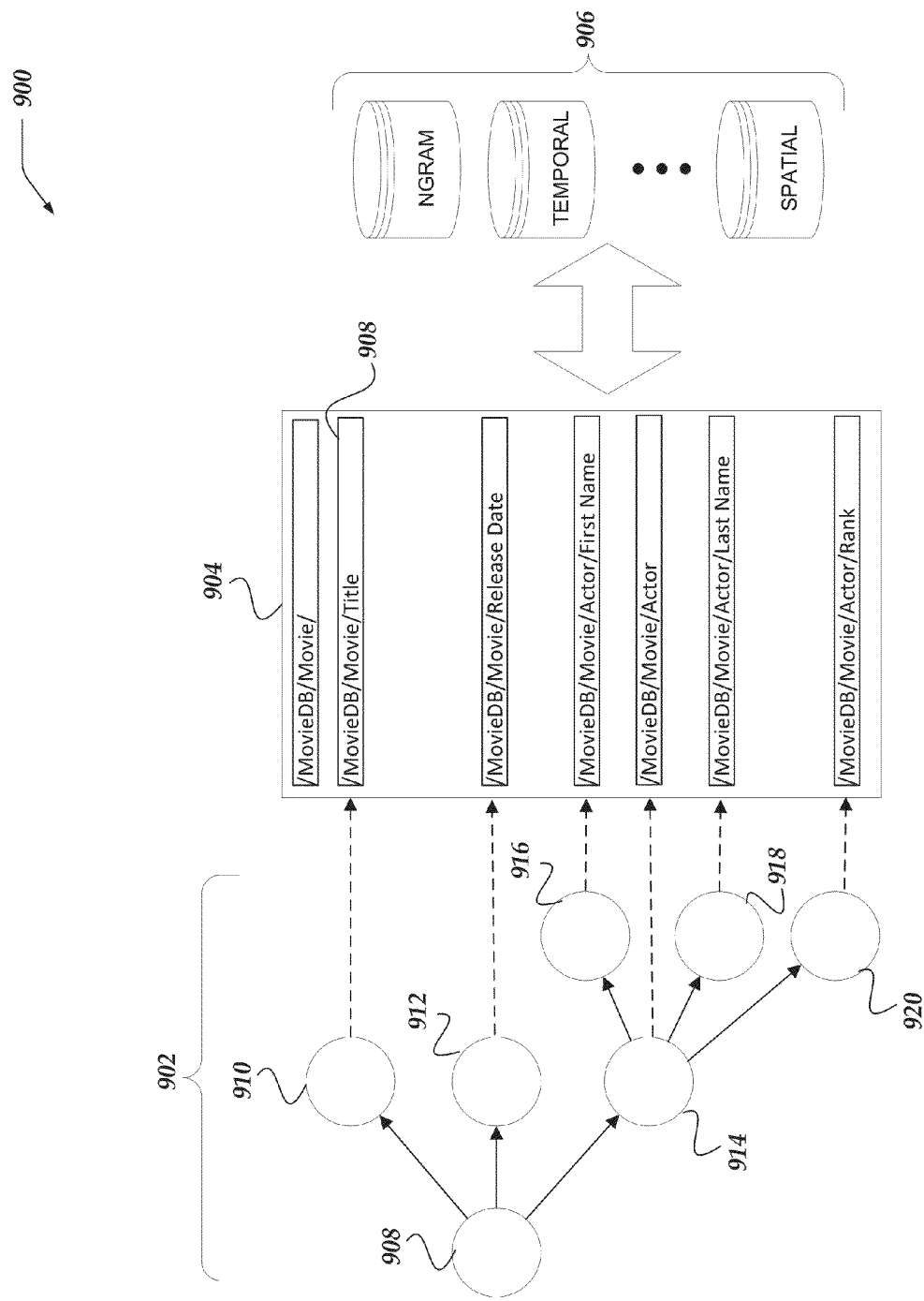
FIG. 9 illustrates a logical representation of a portion of the ingestion process for a system in accordance with at least one of the various embodiments.

FIG. 9 illustrates a logical representation of a portion of the indexing process for a semantic modeling system 900 showing a portion of model-identifiers (MID's) that may be generated for a concept model. In at least one of the various embodiments, semantic modeling system 900 may be arranged for generating semantic models that use multiple indices. Accordingly, FIG. 9 shows three major components of system 900, including, concept model 902, indexer 904 and indices 906.

In at least one of the various embodiments, concept model 902 includes the concepts defined by an ontology and mapped to a raw data by a mapping engine, such as, mapping engine 320. For this example, and to help provide clarity in this description, concept model 902 may be an example of a portion of a concept model based on an ontology for movies. As such, concept model 902 may comprise, movie concept 908, movie title concept 910, movie release date concept 912, actor concept 941, actor first name concept 916, actor last name concept 918, actor rank concept 920, or the like.

In at least one of the various embodiments, indexer 904 may employ model paths, such as model path 908 to represents structural information that corresponds to the logical representation of the concept in model graph 902. Accordingly, as further discussed below, the path information may be included in MID that corresponds to an instance of the concept.

Accordingly, in this example, in at least one of the various embodiments, movie title concept 910 has a corresponding model path of '/MovieDB/Movie/Title'. The path itself does not define a particular instance of concept, rather it describes where concepts of this type exist in the concept model. Thus, they are structural in nature, defining the shape of the information rather than the particular value for a concept. Likewise, in at least one of the various embodiments, movie actor concept 914 has a model path of 'MovieDB/Movie/Actor'.

And, movie actor first name concept 916 has a path of '/MovieDB/Movie/Actor/First Name'.

In at least one of the various embodiments, indices 906 may be where the values that correspond to particular concept instances may be indexed. In at least one of the various embodiments, indices 906 include multiple indices because values for the concepts discovered during ingestion may be indexed using indices that may be optimized for the data type of the value. In at least one of the various embodiments, indexer 904 may employ meta-data such as content-type information that may be included the raw data graph nodes that are mapped to the concept to select indices for indexing a concept.

Referring to concept model 902 as an example, values associated with movie title concept 910 may be indexed in an n-gram indices. Because the value for titles is text information suitable for indexing with n-gram index. Likewise, in at least one of the various embodiments, values associated with movie released date concept 912 may be indexed in a temporal index since the value is a time value. And, in at least one of the various embodiments, values associated with concepts that represent geographic information, such as movie country of origin, or actor's birthplace may be indexed using a geospatial index since their values are geospatial. Accordingly, the values associated with the concepts may be indexed (and searched for) using indexes that are optimized for the type of data comprising their underlying values.

Figure 10:
FIG. 10 illustrates model-identifiers in accordance with at least one of the various embodiments.

FIG. 10 illustrates model-identifiers (MIDs) in accordance with at least one of the various embodiments. In at least one of the various embodiments, model-identifiers (MIDs) may be employed for identifying a particular instance of a concept in a concept model. For at least one of the various embodiments, layout 1000 represents a layout for MIDs that may be arranged to include various fields. In at least one of the various embodiments, MIDs may include field 1002 that may represent the model path for a concept within a concept model graph. Accordingly, the length of field 1002 may vary depending on the concept model graph and a concept's location in the graph. In most embodiments, the model path may start with a root node followed by the various concept nodes that would be visited during a traversal of a model graph to the concept.

In at least one of the various embodiments, field 1004 may hold the keys, if any, that correspond to the individual instances of concepts included in the path. In some embodiments, the keys may be necessary to identify the particular instance(s) of a concept that in the path. For example, some concepts represented in a model graph may represent more than one particular instance of a concept. This is possible and/or likely because the model graph represents the structure of the information rather than pointing to particular instances of data. Accordingly, in some embodiments, if a MID path includes concepts that correspond to multiple concept instances the key is provided for each multivalued concept in the model path to determine a particular instance of concept that is represented by the MID. Further, for fields that have singular representations a key value of zero may be supplied.

For example, in at least one of the various embodiments, MID 1008 illustrates a particular instance of a concept. In this example, MID 1008 represents the concept of a first name for an actor in a movie. In this example, field 1010 includes the path within the concept model graph for the concept. Field 1012, field 1014, and field 1016 hold a keys corresponding to particular values or instances of the concept represented by the path portion. In this example, field 1012 corresponds to the root of the model graph, field 1014 identifies the particular movie that the movie portion of the path in the MID represents; and field 1016 holds a key representing the particular actor for the concept instance.

As discussed, in at least one of the various embodiments, mapping processes may be arranged to generate MIDs for the concept instances that may be associated with raw data nodes that are discovered during ingestion. In at least one of the various embodiments, each concept instance in a semantic model may be represented by at least one unique MID. However, in at least one of the various embodiments, values from the same source data may be represented by multiple MIDs in the concept model. For example, MID 1008 represents a MID for an actor's first name that may be included in a source data record. In this example, another mapping process may be arranged to produce a 'Person' concept that represents all the persons identified by in the source data, accordingly, it may generate another different MID, such as MID 1020 that also refers to the actor's first name (since the actor is also a person). In this example, MID 1020 may be generated from the same source data as MID 1008 but by a different mapping process than the one that produced MID 1008. Accordingly, in at least one of the various embodiments, field 1022 includes the path within the model graph for the concept; field 1024 is key value for root of the model graph; and field 1026 is key that identifies the particular person.

In at least one of the various embodiments, MIDs may be compressed or otherwise transformed to reduce storage size and/or to reduce processing costs. For example, hash 1030 may be generated by hashing MID 1008 to generate a unique hash key that may be used to represent MID 1008. In this example, hash 1030 is generated using the SHA-1 hashing algorithm. In other embodiments, other hashing algorithms and/or compression algorithms may be employed.

In at least one of the various embodiments, the path portion of the MID may be represented using one or more numeric encoding schemes for representing a path in a graph. However, for clarity, herein paths are usually shown as expanded strings. (e.g., path 1010).

Figure 11:
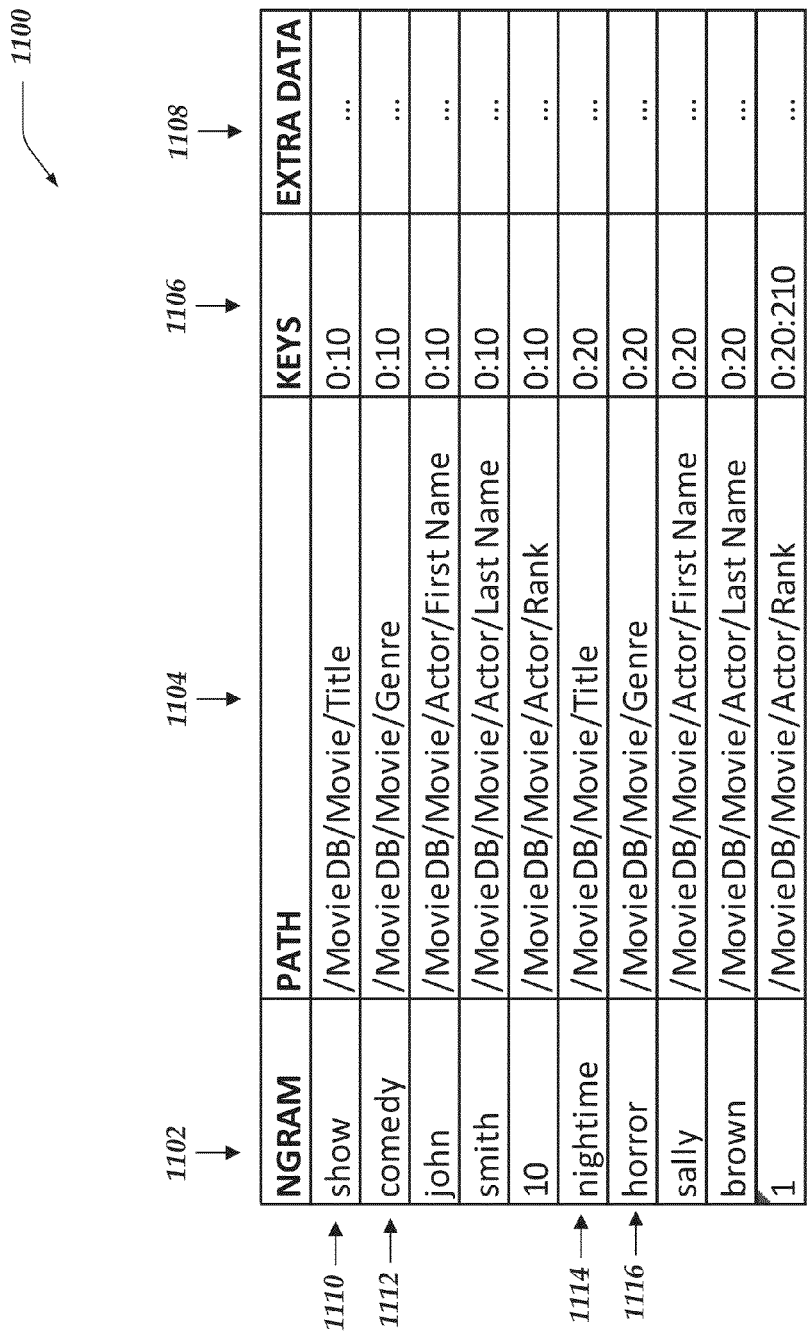
FIG. 11 shows a portion of an index for indexing n-gram valued MIDs in accordance with at least one of the various embodiments.
Figure 12:
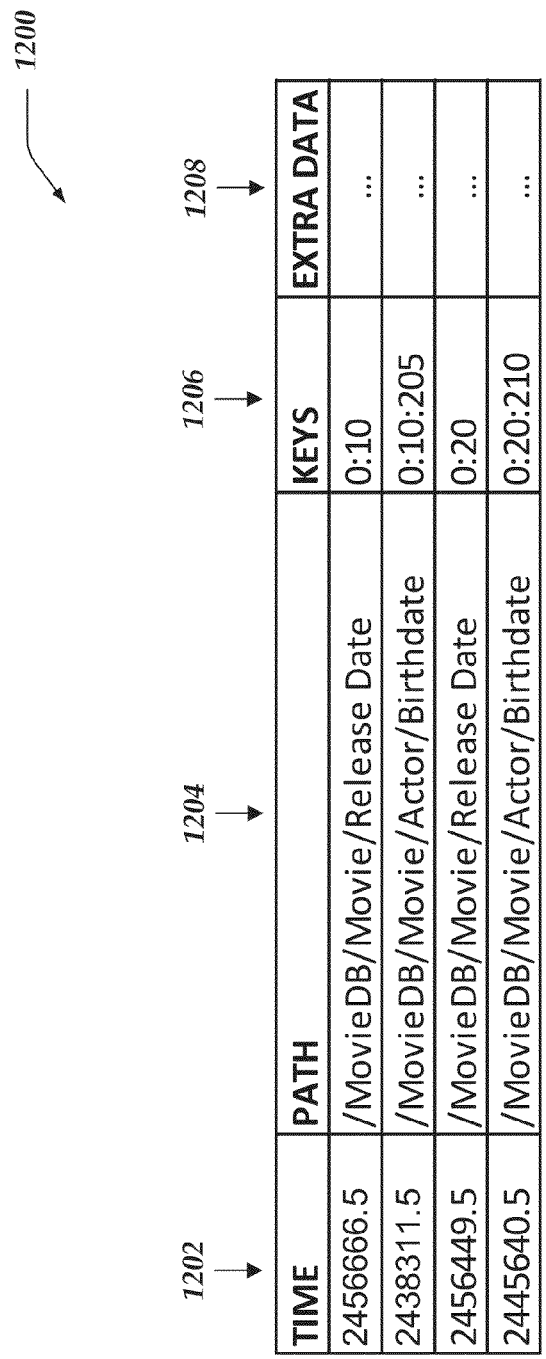
FIG. 12 shows a portion of an index for indexing time-based valued MIDs in accordance with at least one of the various embodiments.
Figure 13:
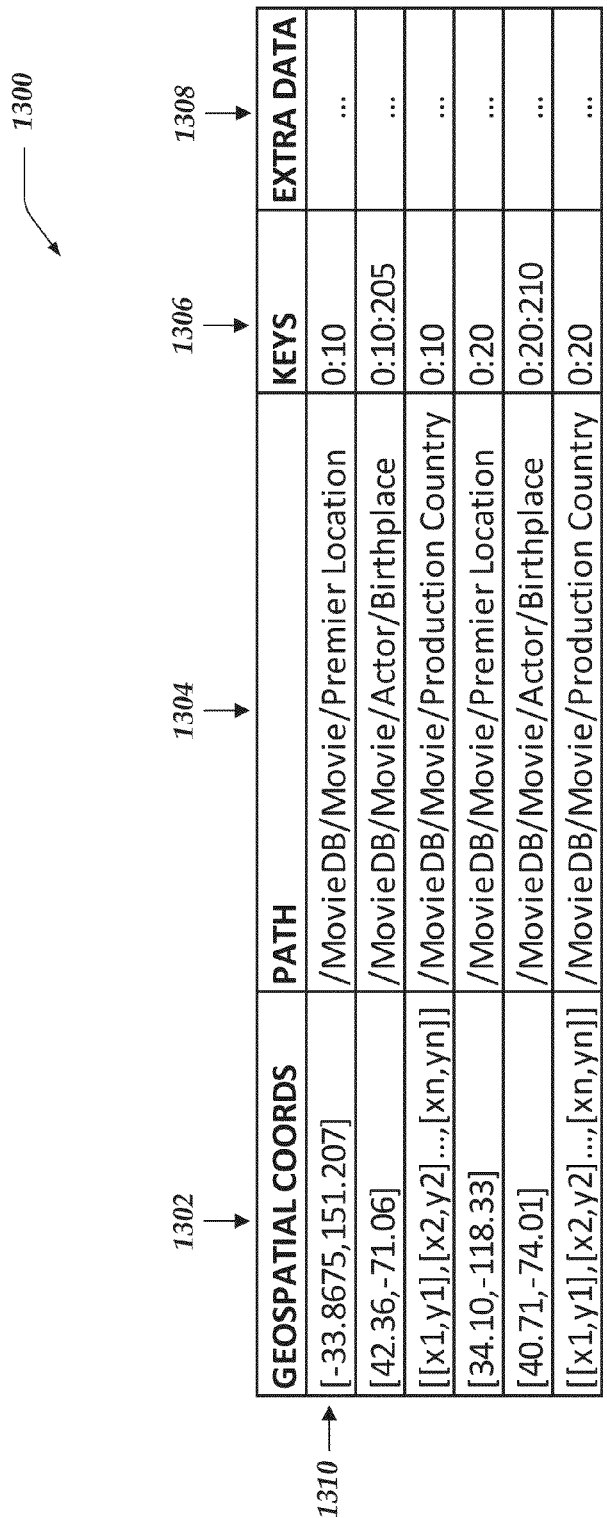
FIG. 13 shows a portion of an index for indexing geo-spatial valued MIDs in accordance with at least one of the various embodiments.

FIGS. 11, 12, and 13 show portions of indices that may be produced by an indexer, such as, indexer 319 and/or a knowledge manager application 320. As discussed above, classifiers and mapping processes are arranged to discover and extract concepts from source data. In at least one of the various embodiments, a mapping process may be arranged to generate one or more MIDs that are associated with instances of the concepts. After mapping, the MIDs may be provided to the indexer application, such as, indexer 319 that may be arranged to index the MIDs based on the content-types of their associated raw data values.

FIG. 11 shows a portion of index 1100 for indexing n-gram valued MIDs in accordance with at least one of the various embodiments. In at least one of the various embodiments, some an indexer may be arranged to identify raw data fields that have values that are n-grams. Accordingly, the MIDs associated with these fields may be indexed in an index that is optimized for n-grams.

For example, in at least one of the various embodiments, index 1100 may include various columns, such as, N-gram (column 1102), path (column 1104), key (column 1106), extra data (column 1108), or the like.

In at least one of the various embodiments, column 1102 holds the n-gram values that are associated with the MID in the index. Here, for brevity, only one n-gram is shown associated with each MID. However, in some embodiments, multiple n-gram values may be associated with the same MID. For example, if the value of the concept instance associate with the MID was "mary had a little lamb" the MID may be associated with n-grams, mary, little, lamb, little lamb, mary had a little lamb, and so on. Also, in at least one of the various embodiments, n-gram index keys (column 1102) may include more than one word, for example, "little lamb," "little," and "lamb" may be n-gram keys in the index.

In at least one of the various embodiments, column 1104 may hold the concept model path that is included in the MID. In at least one of the various embodiments, the keys corresponding to the model graph and the concept instance may be stored in column 1106. In this example, for clarity, the keys are shown in the order they may be applied to the model path, delimitated by colons. Accordingly, in at least one of the various embodiments, for MID 1110, the first row in index 1100, after a 0 representing a root node, the next key in column 1106 is 10 which represents an identifier for a particular movie that has been ingested. Likewise, in this example, for MID 1114, column 1106 shows that the movie identified by the key value 20 may be associate with the n-gram 'nighttime'. This means the word nighttime is part of the title for a movie identified by 20. Note, that MID 1114 and MID 1116 both have a common path values and the same keys. This is because they represent different properties in the same concept instance. In contrast, MID 1110 and MID 1114 also share that same path information. However, because they represent different concept instances (e.g., different movies) they have different keys.

In at least one of the various embodiments, the path information in column 1104 may be represented in a numerical format such that each portion of a path corresponds to an integer. For example, in at least one of the various embodiments, MovieDB may be assigned to a value of 2, Movie may be assigned to a value of 8, and Title may assigned a value of 12. Accordingly continuing with this example, the path value for row 1110 may be represented as 020812. Likewise, assuming Genre is assigned to correspond with the value 7, the path for row 1112 may be represented 020807. In at least one of the various embodiments, such numeric values may employed in the index to facilitate faster indexing as well as more compact data representation of the paths. In some embodiments, each path string may be reduced to a unique string using one or more well-known hashing algorithms. One of ordinary skill in the art will appreciate that other compact/numeric schemes may be employed to represent the paths. The paths are paths in a graph and may represented using various path representation techniques. It is in the interest of brevity and clarity that they are shown in an expanded string format throughout this document.

In at least one of the various embodiments, column 1108 is representative of one or more additional columns that may be included in index 1100. Depending on the type of index, the specific 'extra data' columns may vary. For example, in some embodiments, n-gram indices may include extra data related to n-grams, as discussed further below. Likewise, other types of indices may have one more columns to hold other extra data consistent with the type of index.

In at least one of the various embodiments, values that are semantically equivalent and/or semantically similar to the n-gram(s) associated with a MID may be stored as extra data for an n-gram index. For example, in index 1100, MID 1112 is associated with the n-gram 'comedy' thus its extra data values may include words/n-grams that are semantically equivalent/similar to 'comedy'. For example, these may include, funny, humor, humorous, silly, or the like. In at least one of the various embodiments, semantic equivalents may include words from other languages, such as, Komodie (German), comedia (Spanish), or the like.

In at least one of the various embodiments, extra data may also include whole-part relationships between terms that are indexed. In at least one of the various embodiments, terms that have whole-part relationships with an indexed concept instance value and/or n-gram may be stored in one or more extra data columns. For example, referring back to MID 1112, comedy is the base term in column 1102. Accordingly, terms representing 'parts' and/or specializations the notion of comedy may also be associated with MID 1112, such as, joke, punch-line, stand-up, limerick, or the like. Likewise, in at least one of the various embodiments, broader terms that are inclusive of comedy may be associated with MID 1112, such as, story, entertainment, performance, or the like.

Further, in at least one of the various embodiments, as is common for inverted indices in general, a key value n-gram may be associated with more than one MID. Accordingly, indices such as index 1100 may be associated multiple MIDs with a key value based on the source data. For brevity and clarity, associating multiple MID to a key is not shown herein.

FIG. 12 shows a portion of index 1200 for indexing MIDs for time-based valued concept instances in accordance with at least one of the various embodiments. In at least one of the various embodiments, classifiers may extract/identify time-based concept instances from source data, such as, birth days, expiration dates, visit dates, release dates, or the like.

In at least one of the various embodiments, time-based indices may be indices that are designed or optimized for indexing time values. The MIDs associated with time values may be indexed based on the time value rather than indexing on the n-grams that may be included in the date-time values. For example, a MID value of 'Noon, Sep. 18, 2010' may be indexed using the time value, such as, the Julian Date value of 2455458 rather being indexed by n-grams, such as 'noon', 'Sep.', '18', '2010', and so on. Further, in at least one of the various embodiments, different time based indices may convert time values, such as, time of day, dates, date ranges, durations, or the like, to various index-able date formats, such as, Julian, UNIX time, or the like.

For example, in at least one of the various embodiments, index 1200 may include columns similar to those described for index 1100. Columns 1204 (Path), 1208 (Keys), and 1210 (extra data) may be considered the same as their counterparts in index 1100—accordingly, a detailed description is not included here. In at least one of the various embodiments, the path information in column 1204 may be represented in a numerical format similarly as described above for index 1100.

In at least one of the various embodiments, column 1202 (time) represents the date-time value of the concept instance represented in a format suitable for time based indexing. In this example, the time values for MIDs as shown in column 1208 are converted to numeric date value (Julian Date). One of ordinary skill will appreciate that other time formats may be used depending on requirements of the time-based index that being used.

In at least one of the various embodiments, extra data for MIDs in index 1200 may include additional time-based information that may be associated with the MID. For example, if the time value of a MID is close to a holiday or other day/time of significance, it may be indicated in one or more extra data columns.

Further, in at least one of the various embodiments, as is common for inverted indices in general, a key temporal value may be associated with more than one MID. Accordingly, indices such as index 1200 may be associated multiple MIDs with a key value based on the source data. For brevity and clarity, associating multiple MID to a key is not shown herein.

FIG. 13 shows a portion of index 1300 for indexing geo-spatial valued MIDs in accordance with at least one of the various embodiments. Accordingly, in at least one of the various embodiments, MIDs that include geo-spatial values may be indexed in indices that may be optimized for geo-spatial information.

Except for the geo-spatial fields, in at least one of the various embodiments, index 1300 may include columns similar to those described for index 1100 and index 1200. Columns 1304 (Path), 1306 (Keys), and 1308 (extra data) may be considered the same as their counterparts in index 1100 and index 1200—accordingly, a detailed description is not included here. In at least one of the various embodiments, the path information in column 1304 may be represented in a numerical format similarly as described above for index 1100.

In at least one of the various embodiments, geo-spatial values for concept instances discovered by various classifiers may be arranged and/or converted into various formats that may be compatible with indexing geo-spatial information, such as, latitude/longitude coordinates, polygon information, or the like. In this example, column 1304 represents the geo-spatial information for indexing. For example, MID 1310 represents a concept instance that is a location (Sidney, Australia) where a movie first premiered. Accordingly rather than index the MID using the n-grams, Sidney, and Australia, the MID may be indexed based on its GPS coordinates, or latitude and longitude.

In at least one of the various embodiments, extra data information for geo-spatial indices may include additional geo-spatial information that may be associated with the concept instance such as, altitude, terrain type, other GIS information, or the like.

Figure 14:
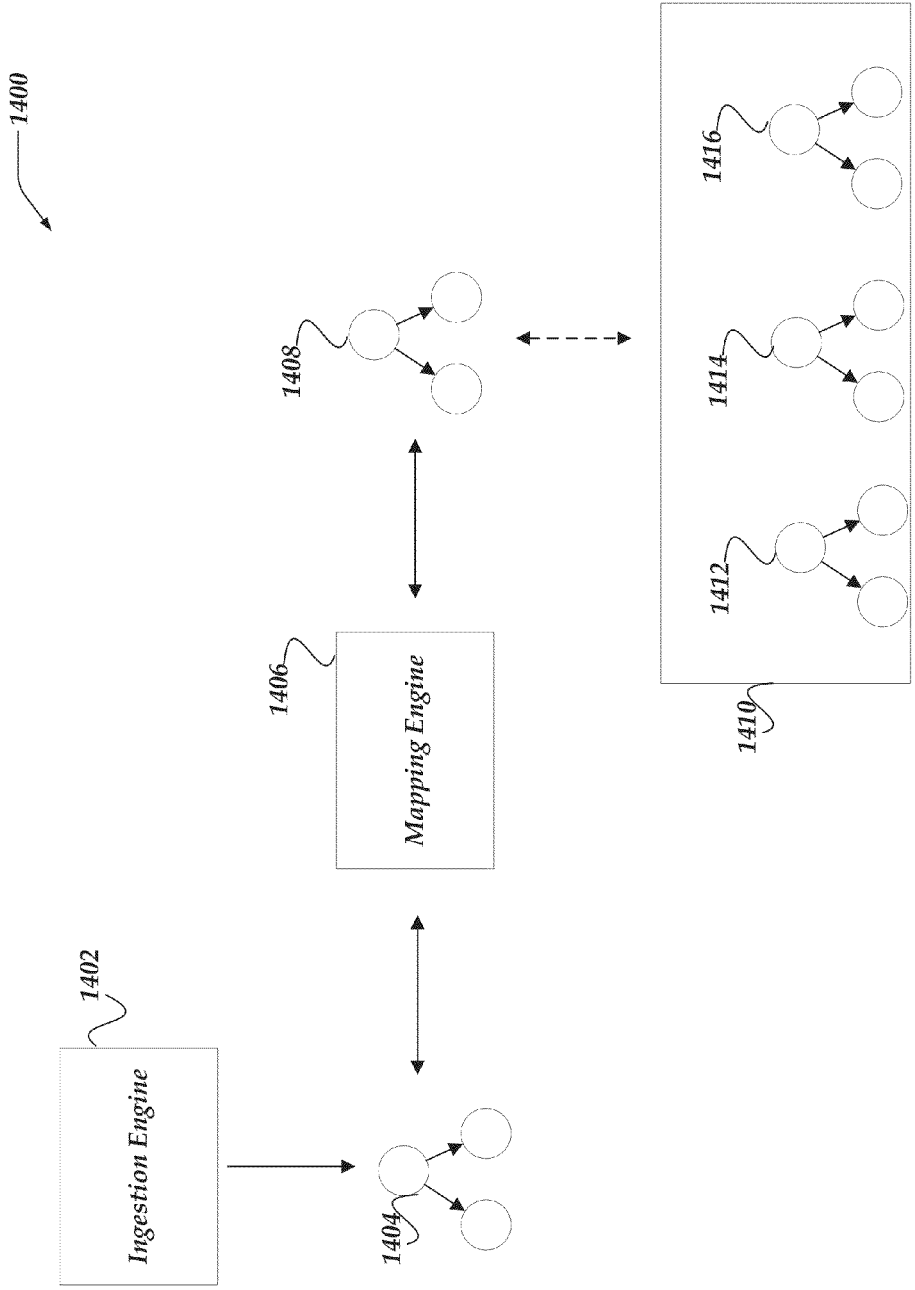
FIG. 14 illustrates a logical representation of the modeling process in accordance with at least one of the various embodiments.

FIG. 14 illustrates a logical representation of the modeling process for a semantic modeling system 1400 in accordance with at least one of the various embodiments. In at least one of the various embodiments, an ingestion engine, such as, ingestion engine 1402 may be arranged to receive source data from one or more sources (as described above). Ingestion engine 1402 performs actions for parsing the source data and generating a raw data graph, such as raw data graph 1404. In at least one of the various embodiments, raw data graph 1404 may be a graph representation of the structure of the source data.

In at least one of the various embodiments, a mapping engine, such as, mapping engine 1406 may be arranged to map nodes and fields from raw data graph to a concept graph, such as, concept graph 1408. In at least one of the various embodiments, mapping engine 1406 may be arranged to perform automatic mapping as well as facilitating user curation actions.

In at least one of the various embodiments, concept graph 1408 may be arranged to represent one or more ontologies. Accordingly, the concepts and relationships in the ontologies may be associated with nodes and fields in the raw data graph. In at least one of the various embodiments, concept graph 1408 may be comprised of portions of one or more ontologies known and/or pre-defined ontologies that may be stored in an ontology data store, such as, ontology data store 1410. For example, graph 1412, graph 1414, and graph 1416 represent graphs for one or more ontologies that may be available.

In at least one of the various embodiments, concept graphs, such as, concept graph 1408 may represent a single or whole pre-defined ontology. Also, in some embodiments, concept graph 1408 may be customized for a particular application, and so on.

Further, in at least one of the various embodiments, as is common for inverted indices in general, a key geographic/spatial value may be associated with more than one MID. Accordingly, indices such as index 1400 may be associated multiple MIDs with a key value based on the source data. For brevity and clarity, associating multiple MID to a key is not shown herein.

Figure 15:
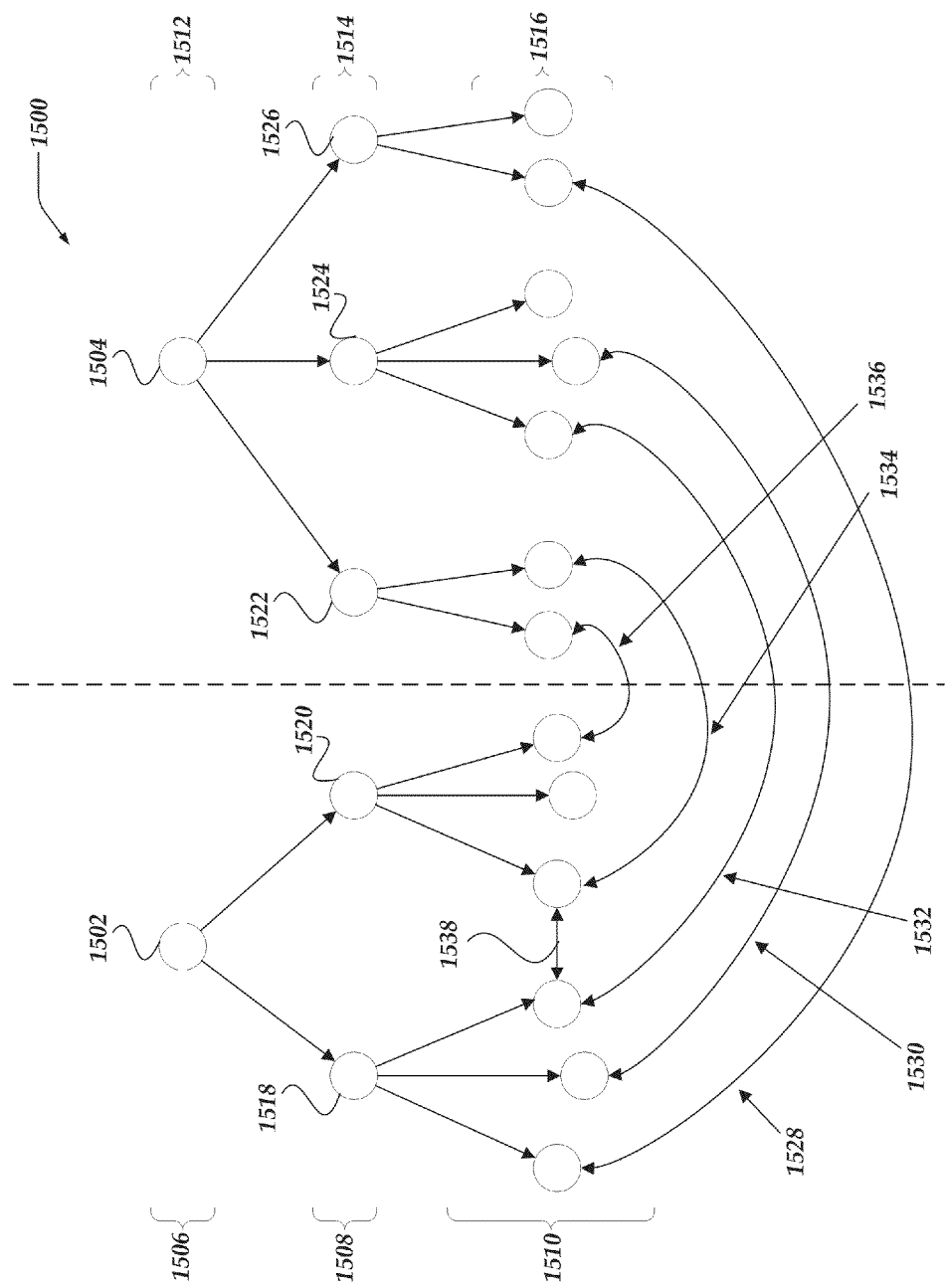
FIG. 15 illustrates a logical representation of a mapping a raw data graph to a concept model in accordance with at least one of the various embodiments.

FIG. 15 shows a logical representation mapping raw data to concepts for modeling system 1500 in accordance with at least one of the various embodiments. As described above an ingestion engine (not shown) may be arranged to process provided source data to generate a raw data graph, such as, raw data graph 1502. Likewise, as discussed above, a mapping engine (not shown) may be arranged to perform action for mapping raw data nodes and fields to concepts and/or concept properties that comprise a concept graph, such as concept graph 1504.

In at least one of the various embodiments, nodes of a raw data graph, such as, raw data graph 1502 may be arranged into namespaces, such as, namespace 1506, schema nodes 1508, and fields 1510. For example, if the source data was a database file, namespace 1056 may include nodes representing the name of a databases included in the file, such as, Movies, Accounting, Medical Charts, or the like. Likewise, for this example of an ingested database file, schema nodes 1508 may represent tables in the database. And, fields 1510 may represent columns of each table.

In some embodiments, if the source data from an XML file the structure and shape of the raw data graph (namespace, nodes, and fields) may be defined by the structure of the XML file. For data sources such as system log files the scheme nodes may be arranged based on log record type, and so on.

In at least one of the various embodiments, concept graph 1504 may be arranged in namespace 1512, concept nodes 1514, and concept properties 1516. In at least one of the various embodiments, the namespace, concept nodes, concept properties, or the like, may be determined based on an ontology for one or more data domains.

In at least one of the various embodiments, a user may define the concept graph by combining portions of one or more existing ontologies. Also, a concept graph may be custom defined for a particular application. In at least one of the various embodiments, concept graph 1504 may be considered to be the structure of a model rather than the data and/or contents of the ingested source data. Likewise, the raw data graph represents the structure of the ingestion source data rather than the actual records.

In at least one of the various embodiments, as described above, one or more classifiers may be arranged to perform actions to augment and/or reshape ingested data. Accordingly, classifiers may be configured to generate schema nodes and/or fields in the raw data graph to represent features that may not be readily and/or inherently visible/present in the source data. For example, if a semantic modeling system is employed to ingest a large database of patient medical records, it may be of value to define a field that indicates if a patient has ever had cancer. However, a field corresponding "having cancer" may be represented multiple ways in any given patient's clinical record. Namely, because the patient record may indicate the presence of cancer by using the precise medical terminology to identify the disease/condition, rather than a binary indicator that the patient has cancer.

Accordingly, for example, a classifier may be arranged to generate a field that indicates whether the patient has ever been diagnosed with cancer. In this example, in at least one of the various embodiments, to accomplish this a classifier, such as, classifier 510 in FIG. 5, may be arranged to determine during the ingestion of a clinical patient record, if a person has been diagnosed with cancer. In this example, the classifier may be arranged to scan the source data record (the patient record) for information that indicates that patient has cancer.

For example, the classifier may scan the patient diagnoses record in the patient record to determine if there are matches to one or more of the dozens of different types of known cancers. If the classifier finds a match, a binary field in the raw data graph may be set accordingly.

Also, in at least one of the various embodiments, classifiers may be arranged to determine various features of the fields in the raw data graph. For example, as the source data is being ingested one or more registered classifiers may analyze the source data to determine if the field represents an email address, date, time, first name, last name, street address, telephone number, IP address, URL, or the like, or combination thereof. This feature information may be stored in the corresponding field nodes of the raw data graph.

In at least one of the various embodiments, classifiers may be arranged to perform more specialized feature recognition, such as, disambiguation of data types. For example, the corpus of source data may include one or more, names, acronyms, values, or the like, that may refer to different concepts or ideas. Accordingly, a classifier may be arranged to perform extended analysis to attempt to disambiguate terms that have different meanings depending on the context of their use. For example, the acronym MPH could refer to a rate of speed (miles-per-hour) or an education credential (Master's in Public Health). In this example, a classifier may be arranged to look in the text surrounding the ambiguous term in the source data record for indications of the meaning. For example, if a number precedes the MPH it may be more likely that the term refers to miles-per-hour rather than Master of Public Health. In at least one of the various embodiments, nodes and/or fields in the raw data graph may be annotated with the disambiguation information accordingly.

In at least one of the various embodiments, a mapping engine may be arranged to perform actions to map nodes and fields of the raw data graph to the concept graph. In some cases, the mapping engine may be enabled to perform automatic mapping based on configuration information and/or rules defined for the concept graph. In other cases, the mapping engine may present a user with a list of fields that may be likely candidates for mapping to particular concepts and/or concept properties in the concept graph.

In at least one of the various embodiments, in FIG. 15 examples of such mappings are indicated by double ended arrows, mapping 1528, mapping, 1530, mapping 1532, mapping 1534, and mapping 1536. In general, fields from the raw data graph may be mapped to properties in the concept graph. In at least one of the various embodiments, the mapping engine may selectively map a portion of the fields from a raw data graph node to a concept node. For example, two fields from raw node 1520 are mapped to properties of concept node 1522. Likewise, for example, two fields from raw node 1518 are mapped to properties of concept node 1524 while one field of raw node 1518 is mapped to a property of concept node 1526.

In at least one of the various embodiments, mapping rules may include references to one or more annotations in the raw data graph that may have been generated by the classifiers. For example, a mapping rule may map raw data nodes that have fields, such as, first name, last name, address, and telephone number, or the like, to a person concept in the concept graph. Likewise, for movie data, if a raw data node include fields such as, title, release date, the raw node may be mapped to a movie concept node in the concept graph.

Further, in some embodiments, ingested source data may include relationship information such as joins. The ingestion engine may be arranged to recognize joins based on foreign keys in the source data. Accordingly, in some embodiments, the ingestion engine may add a join edge, such as, edge 1538, to represent the join. In at least one of the various embodiments, the edge may be annotated with meta-data to indicate the direction and/or cardinality information for the join.

FIG. 16 shows a portion of forward index 1600 in accordance with at least one of the various embodiments. In at least one of the various embodiments, an indexer, such as, indexer 319, may be arranged to generate one or more indexes that may be employed for associating field values of the raw data graph with MIDs. As described above, MID may be comprised on a path and keys. In index 1600, column 1602 represents a column for holding MID path information and column 1604 represents a column in the index for holding the keys information for a MID. And, in at least one of the various embodiments, column 1606 of index 1600 holds the field value that is associated with the MID.

Accordingly, in at least one of the various embodiments, row 1608 of index 1600 includes data corresponding to a movie title. The information in row 1608's path column ("/MovieDB/Movie/Title") describes the represent concept in terms of its location in the model graph. The keys column of row 1608 holds values representing the key to identify a particular entity for each variable portion of the path. And, the value column of row 1608 holds the actual value of concept instance taken from the raw data (e.g., source data). In at least one of the various embodiments, the path information in column 1602 may be represented in a numerical format similarly as described above for index 1100. In at least one of the various embodiments, such numeric values may employed in the index to facilitate faster indexing as well as more compact data representation of the paths.

In at least one of the various embodiments, index 1600 and others like it, may be employed quickly determine the source value that is associated with a particular MID. Thus, for example, indices, such as, index 1100 may be used to lookup MIDs given one or more search terms. And, index 1600 may be employed to determine the raw data values that are associated with the MIDs.

Generalized Operation

FIGS. 17-23 represent the generalized operation for dynamic semantic models using multiple indices in accordance with at least one of the various embodiments. In at least one of the various embodiments, processes 1700, 1800, 1900, 2000, 2100, 2200, and 2300 described in conjunction with FIGS. 17-23 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computer, such as, those in a cloud-based environment. However, embodiments are not so limited and various combinations of network computers, client computers, or the like may be utilized. Further, in at least one of the various embodiments, the processes described in conjunction with FIGS. 17-23 may be operative in semantic modeling systems and/or architectures such as those described in conjunction with FIGS. 4-16.

Figure 17:
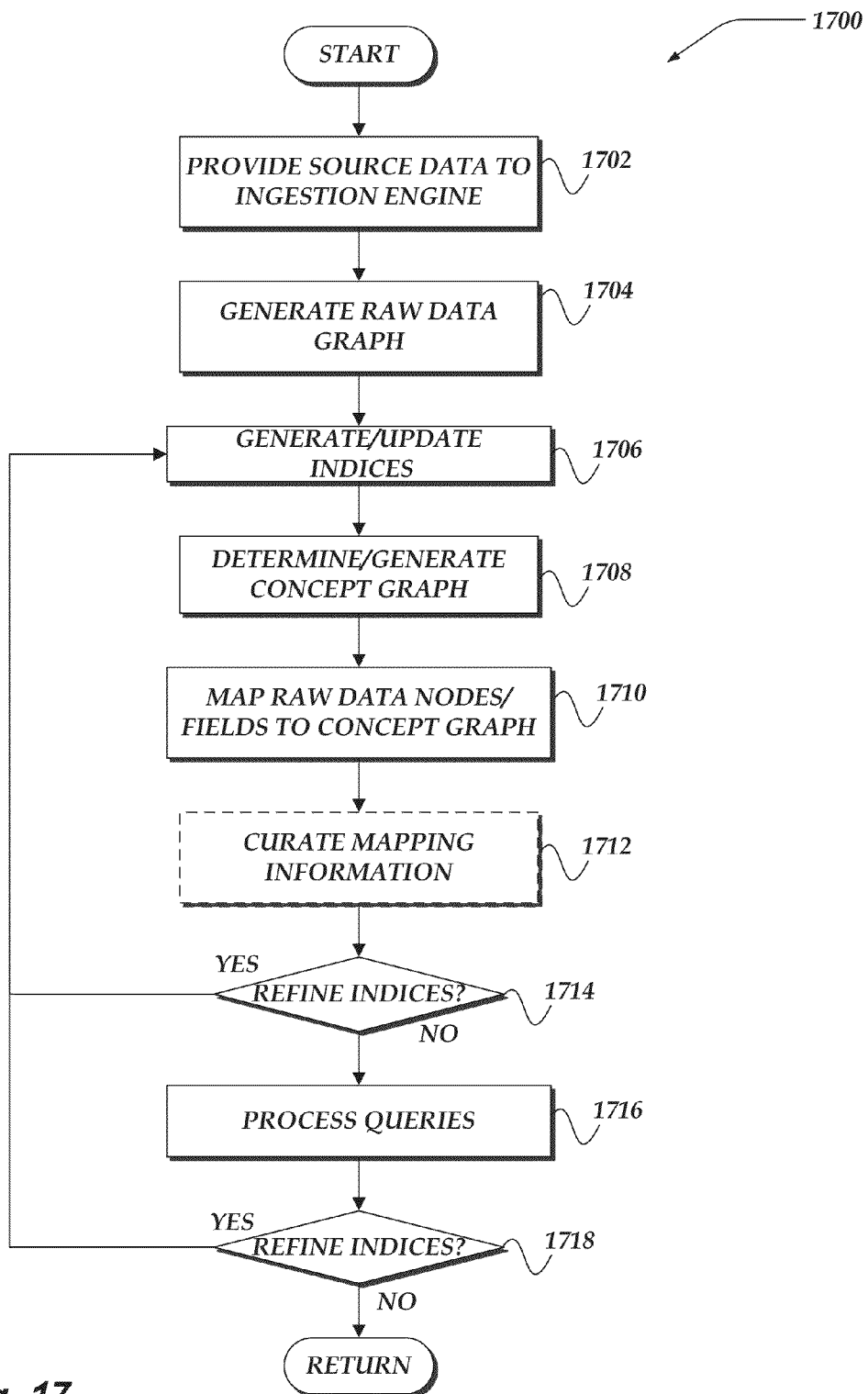
FIG. 17 shows an overview flowchart for a process for generating dynamic semantic models having multiple indices in accordance with at least one of the various embodiments.

FIG. 17 shows an overview flow for process 1700 for generating dynamic semantic models having multiple indices in accordance with at least one of the various embodiments. After a start block, at block 1702, source data may be provided to an ingestion engine. As described above, the ingestion engine may be arranged to process source data provided in a variety of forms and formats. In at least one of the various embodiments, source data may be provided by way of an API.

Also, in at least one of the various embodiments, an API may be employed by users or other processes to provide information for obtaining the source data (e.g., links, file system information, or the like). In some embodiments, the API may be implemented as a library, as a Representational State Transfer (REST) API, remote procedure calls (RPC), or the like, or combination thereof.

At block 1704, in at least one of the various embodiments, the ingestion engine maybe arranged generate a raw data graph that represents the structure of the ingested source data. In at least one of the various embodiments, raw data graphs may include schema nodes based on the structure of the source data as well as fields that represent the features for the schema nodes. For example, if the source data is a database, the schema nodes may correspond to tables in the databases and the fields may correspond to columns of the tables.

In at least one of the various embodiments, one or more classifiers may be registered to process and/or analysis the source data as it is ingested. Classifiers may be determine one or more attributes of the raw data nodes and fields. Appropriate annotations may be added to the raw data nodes and/or fields to represent to discovered attributes. Also, in some cases, classifiers may produce new fields that may be added to the raw data graph, as described above.

At block 1706, in at least one of the various embodiments, process 1700 may be arranged to generate multiple indices. In at least one of the various embodiments, indexes may be generated during the ingestion process. Also, in at least one of the various embodiments, indexes may be refined and/or generated after the mapping between the raw data graph and the concept graph is complete. Indices generated after the mapping may include the various MID indexes that associate paths in the concept graph with source data records.

In at least one of the various embodiments, the generation and refinement of the indices may be an ongoing process. As users observe the raw data graph and work with the model graphs they may identify one or more refinements that may be made. Also, as result of queries results, the system may be arranged to introduce index information automatically. In at least one of the various embodiments, a user or other process may be enabled to generate refinements by interacting with the system over an API. In at least one of the various embodiments, the API may be implemented as a library, as a Representational State Transfer (REST) API, remote procedure calls (RPC), or the like, or combination thereof.

At block 1708, in at least one of the various embodiments, a concept graph and/or concept model may be determined. In at least one of the various embodiments, as discussed above, concept graphs include concept nodes, concept properties and the relationships between them. A particular concept graph may be selected from a collection of available concept graphs. Or, in some embodiments, concept graphs may be created for a particular application. Further still, a concept graph may be generated from portions of existing concept graphs. As discussed above, a concept graph may be arranged to correspond to ontologies used for modeling the system that are being modeled.

In at least one of the various embodiments, the concept graph may be selected/determined based on predefined configuration information that is established before the source data is ingested. For example, if a user knows that the source data is patient records, a concept graph for a medical patient ontology may be selected before ingestion of the source data.

At block 1710, in at least one of the various embodiments, a mapping engine may map the raw data nodes and/or fields to concept nodes and concept properties. In at least one of the various embodiments, the mapping engine may be arranged to include rules for automatically determining mappings between the raw data graph and the concept graph. Also, in at least one of the various embodiments, the mapping engine may enable users to manually map raw data information to the concept graph. In some embodiments, the mapping engine may identify candidates (nodes and/or fields) in the raw data graph for mapping to the concept graph. Such candidates may be based on rules that are employed by the mapping engine.

At block 1712, optionally, in some embodiments, a user may be enabled to manually curate the mapping information. Accordingly, the user may be enabled to establish, modify, and/or remove mapping between raw data graph information and the concept graph. In at least one of the various embodiments, the user may be enabled to curate the mapping information using a graphical user interface, command-line interface, configuration files, or the like, or combination thereof.

In at least one of the various embodiments, a user may be enabled to curate mapping information using an client application that interacts with process 1700 over an API. In at least one of the various embodiments, the API may implemented in a library, as a Representational State Transfer (REST) API, remote procedure calls (RPC), or the like, or combination thereof.

At decision block 1714, in at least one of the various embodiments, if the indices may be further refined, control may loop back to block 1706; otherwise, control may flow to block 1716. In at least one of the various embodiments, interaction of users with the concept model and/or the raw data graph may indicate that one or more indices may be refined. In at least one of the various embodiments, during a curation session, a user may identify raw data fields that may be incorrectly associated with a particular concept. For example, in at least one of the various embodiments, a user may discover that values that initially where identified as social security numbers are actually proprietary health provider identifiers. In such cases, a user may make a refinement to associate the value with a more accurate concept. In some embodiments, refinements may result in one or more indices being updated or modified.

In at least one of the various embodiments, a user or other process may be enabled to generate refinements by interacting with the system over an API. In at least one of the various embodiments, the API may be implemented as a library, as a Representational State Transfer (REST) API, remote procedure calls (RPC), or the like, or combination thereof.

At block 1716, in at least one of the various embodiments, if the source data is ingested and the raw data graph is mapped to the concept graph the system may be considered ready for processing queries and/or searches.

At decision block 1718, in at least one of the various embodiments, if refinement of indices is needed, control may loop back to block 1706; otherwise, control may be returned to a calling process. In at least one of the various embodiments, results of a query and/or the interaction of users with the results of queries may result is refinements to the concept model. Users may explicitly manipulate the results by grouping, sorting, selecting, or the like. Or, in at least one of the various embodiments, the process may monitor how a user reacts to results to implicitly determine refinement to the indices. In at least one of the various embodiments, a user or other process may be enabled to generate refinements by interacting with the system over an API. In at least one of the various embodiments, the API may be implemented as a library, as a Representational State Transfer (REST) API, remote procedure calls (RPC), or the like, or combination thereof.

Figure 18:
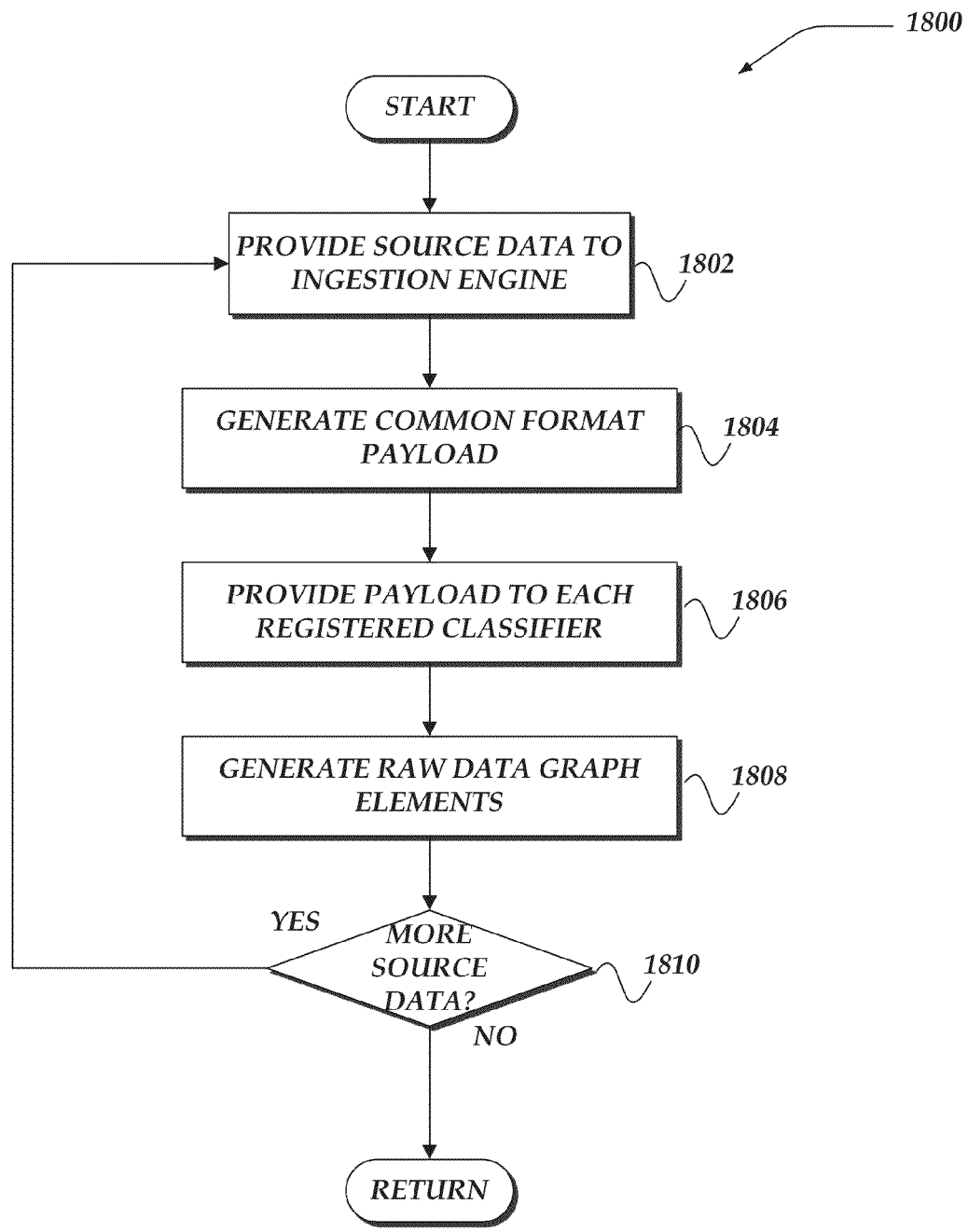
FIG. 18 shows an overview flowchart for a process for ingesting source data for a dynamic semantic model in accordance with at least one of the various embodiments.

FIG. 18 shows an overview flowchart for process 1800 for data ingestion in accordance with at least one of the various embodiments. After a start block, at block 1802, source data may be provided to an ingestion engine. In at least one of the various embodiments, source data may be provided by one or more source data server computers, such as, source data server computer 118. In at least one of the various embodiments, source data may be provided in the form of documents/records from file systems, archives, databases, or the like. Also, in at least one of the various embodiments, source data may be provided from a continuous streaming source, such as, audio, video, log streams, event streams, or the like.

At block 1804, in at least one of the various embodiments, the ingestion engine may generate a payload that may be provide a common format for processing the source data. The provided source data may be added to the generated payload. In at least one of the various embodiments, the common format payload may be arranged to provide a normalized data structure and/or interface for accessing the source data. In at least one of the various embodiments, classifiers may be arranged to rely on the common format of the payload during ingestion.

At block 1806, in at least one of the various embodiments, the payload may be provided to each classifier that is registered with the ingestion engine. In at least one of the various embodiments, as discussed above, there may be one or more classifiers, each arranged to perform different analysis of the payload and/or source data. Configuration information that is accessed by the ingestion engine may include a list of one or more classifiers that the payload may be provided. In some embodiments, one or more of the classifiers may be serially provided the payload according to a rank order, or prioritization. In other embodiments, one or more of the classifiers may be provided the payload in parallel.

In at least one of the various embodiments, some classifiers may be arranged to format and/or prepare the source data for inclusion in the payload. Also, some classifiers may be arranged to generate meta-data, such as, record type, content-type, source, age/date, owner, disambiguation information or the like, to include in the payload. Other classifiers may be provided to identify non-obvious/hidden features from the source data.

At block 1808, in at least one of the various embodiments, the information included in the payload may be employed for generating schema nodes and fields for the raw data graph.

At decision block 1810, in at least one of the various embodiments, if more source data is available, control may loop back to block 1802; otherwise, the ingestion process may be complete and control may be returned to a calling process.

Figure 19:
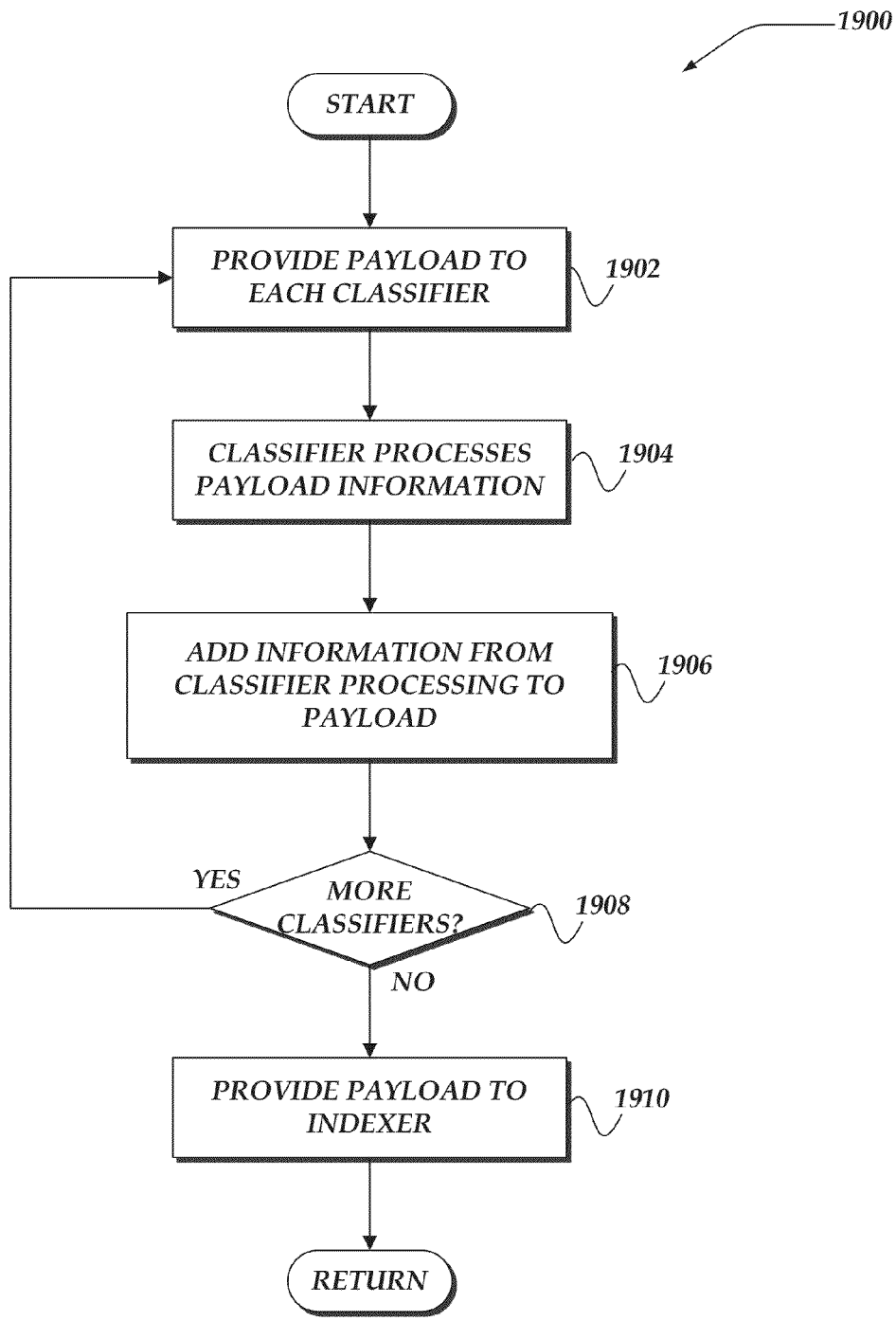
FIG. 19 shows an overview flowchart for a process for performing pipelined actions to classify information for a dynamic semantic model in accordance with at least one of the various embodiments.

FIG. 19 shows an overview flowchart for process 1900 for ingesting source data for a dynamic semantic model in accordance with at least one of the various embodiments. After a start block, at block 1902, a payload may be provided to each classifier that may be registered with the ingestion engine. In at least one of the various embodiments, the payload may be a data structure object that includes the unprocessed source data as well as annotation information that may have been added by one or more previously executing classifiers. In at least one of the various embodiments, classifiers may be registered with the ingestion engine by a user and/or configuration information. In at least one of the various embodiments, some classifiers may be built-in system level classifiers that may be arranged to perform system tasks such as adding timestamps, identifiers, or the like, to setup the payload.

At block 1904, in at least one of the various embodiments, as a classifier is provided a payload it may perform actions to identify features in the source data.

In at least one of the various embodiments, classifiers may be arranged to discover and/or extract feature information from the source data and/or the payload itself. In some embodiments, one or more classifiers may be specifically designed to process particular types of source data. These classifiers may be looking for particular fields and/or patterns in the source data that may be identified as features.

In at least one of the various embodiments, classifiers may be arranged to perform an initial operation to determine if the payload includes information that may be relevant to them. Accordingly, in some embodiments, classifiers may be arranged to test values in the payload meta-data, such as, record type, content-type, source, age/date, owner, or the like, to determine if the classifier may further process the data. In at least one of the various embodiments, a classifier that may be arranged to process a source record from a particular data source, such as a particular patient/clinical record database, may accept or decline an invitation to process the payload based on the values of one or more meta-data values. Likewise, in at least one of the various embodiments, a classifier may be designed to process older source records (e.g., that may be provided in an older format). Accordingly, such a classifier may be arranged to accept older records that may be older than a defined date and deny records that may be newer than the defined date.

At block 1906, in at least one of the various embodiments, one or more actions performed by a classifier may produce information that may be added to the payload. In at least one of the various embodiments, classifiers that discover and extract one or more features from the source data may add them to the payload.

In at least one of the various embodiments, information added to the payload may be available to other classifiers that may be subsequently provided the payload for processing. Thus, in at least one of the various embodiments, features discovered by classifiers based on the current payload may also be added to the payload.

At decision block 1908, in at least one of the various embodiments, if there are more classifiers available to process the payload, control may loop back to block 1902; otherwise, control may flow to block 1910.

At block 1910, in at least one of the various embodiments, since all the registered classifiers have had an opportunity to process the payload, the payload may be provided to an indexer, such as, indexer 319. In at least one of the various embodiments, the payload provided to the indexer may include the information that may have been added to the payload by the classifiers. The indexer may generate the raw data graph from the information in the payload. The feature information that was determined and/or discovered by the classifiers may be added to elements of the raw data graph as annotations to provide more information about the graph element. Next, control may be returned to a calling process.

Figure 20:
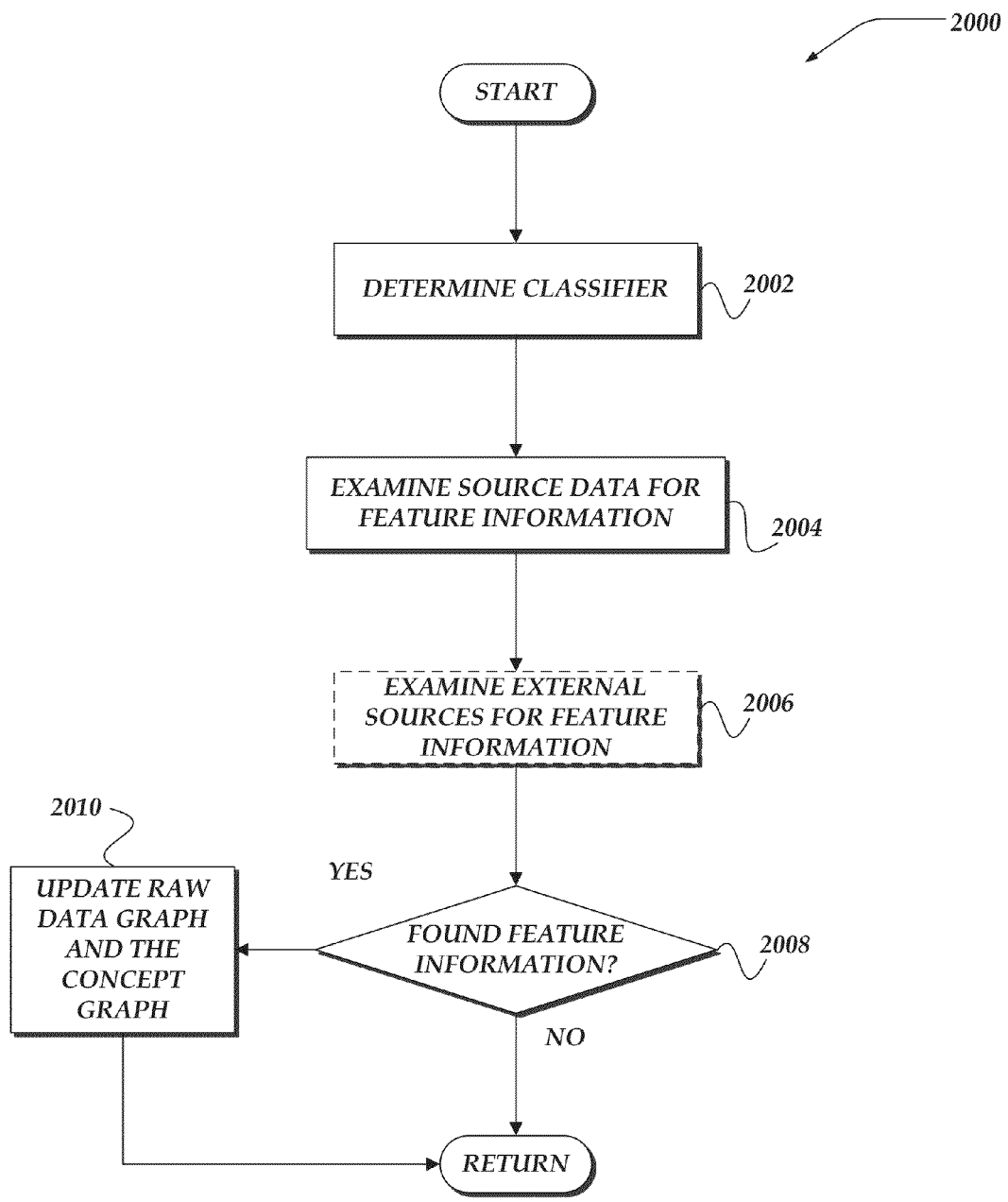
FIG. 20 shows an overview flowchart for a process for indexing information for a dynamic semantic model with multiple indices in accordance with at least one of the various embodiments.

FIG. 20 shows an overview flowchart for process 2000 for performing actions to classify information and discover features in the source data for a dynamic semantic model in accordance with at least one of the various embodiments. After a start block, at block 2002, a classifier may be determined for analyzing the raw data. In at least one of the various embodiments, as described above one or more classifiers may be registered with a classification engine. In at least one of the various embodiments, classifiers may execute in their order of registration. In some embodiments, other configuration information and/or rule based policies may be employed to determine which classifier to execute.

At block 2006, in at least one of the various embodiments, the classifier may be arranged to examine the raw data graph and the source content that is associated with the raw data graph. In at least one of the various embodiments, the raw data graph elements may be arranged include meta-data that may indicate to the classifier how the information in the payload should be processed. In at least one of the various embodiments, the raw data element may include meta-data associated with its correspondent source data. In at least one of the various embodiments, such meta-data may include an identity of the source of the record, record format information, ownership information, creation date, modification date, language, or the like.

In at least one of the various embodiments, one or more classifiers may be arranged to process source data that may be in particular formats. For example, in at least one of the various embodiments, some classifiers may be arranged process text files while others may be arranged to process binary data, such as, images, videos, or the like. Likewise, in at least one of the various embodiments, some classifiers may be designed for processing source records from a particular data source. For example, in at least one of the various embodiments, it may be known in advance that source data from a particular source includes information and/or formatting that may be unique to that source. Accordingly, one or more classifiers may be arranged to process the source data having information and/or formatting that may be unique to that source. Likewise, in at least one of the various embodiments, some classifiers may be arranged to ignore source data from particular data sources. In at least one of the various embodiments, one or more classifiers may be arranged to generate the meta-data used by subsequent classifiers. In at least one of the various embodiments, there may be one or more built-in classifiers that may be arranged process all incoming source data to produce the meta-data that subsequent classifiers may use.

In at least one of the various embodiments, a classifier may examine the source data that is associated with a raw data graph element to extract and/or discover feature information in the source data record. In at least one of the various embodiments, a classifier may be arranged to examine the source data to identify patterns of information that may be associated with one or more features of the source data.

In at least one of the various embodiments, the particular actions performed by each classifier may depend on the format of the source data. Likewise, if a classifier arranged to process one or more particular data formats determines that the source data is in a unsupported format, the classifier may abort its processing.

For example, if the source data is known to be a XML file, the classifier may be arranged to process XML. In at least one of the various embodiments, the classifier may have access to a Document Type Definition (DTD) or other mechanism for validating the XML of the source data. In other embodiments, the classifier may employ pattern matching for finding particular labels, attribute names, or the like include in the XML file rather being limited to a DTD.

In at least one of the various embodiments, some classifiers may be arranged recognize data in multiple formats. For example, in at least one of the various embodiments, a single classifier may be arranged process XML formatted information as well as JSON formatted information.

In at least one of the various embodiments, classifiers may be arranged to identify and/or discover a single feature in the source data. Also, in at least one of the various embodiments, the classifier may refer to feature information that may have been previously added to the raw data element by other classifiers.

In at least one of the various embodiments, one or more classifiers may be arranged to perform actions to augment and/or reshape ingested source data. Accordingly, classifiers may be configured to generate concepts/concept instances comprising features/fields that may not be readily and/or inherently visible in the source data. For example, if a semantic modeling system is employed to ingest a large data base of patient medical records, it may be advantageous to define a field that indicates if a patient has ever had cancer. However, the attribute of "having cancer" may be represented multiple ways in any given patient's clinical record. Namely, because the patient record may indicate the presence of cancer by using the precise medical terminology to identify the disease/condition, rather than a binary indictor that the patient has cancer.

Accordingly, for example, a classifier may be arranged to generate a feature information that may indicate whether the patient has ever been diagnosed with cancer. In this example, in at least one of the various embodiments, to accomplish this a classifier may be arranged to determine from ingesting a clinical patient record if a person has been diagnosed with cancer. In this example, the classifier may be arranged to scan the source data record (the patient record) for information that indicates that patient has cancer. For example, the classifier may scan the patient diagnoses to determine if there are matches to one or more of the dozens of different types of known cancers. If the classifier finds a match, a field in the raw data graph corresponding to the patient "having cancer" may be set to value of 'yes'. If the classifier does not find a match, the value corresponding to the patient "having cancer" may be set to 'no'.

In at least one of the various embodiments, during the ingestion process this type of augmentation information may be added to the raw data graph during the classification process as if it was a piece of information that was included in the source data.

At block 2006, in at least one of the various embodiments, optionally, a classifier may be arranged to employ one or more external information sources to process the raw data graph elements and/or the source data. In at least one of the various embodiments, a classifier may be arranged to communicate with one or more external databases or other information services. Such communication may be employed for confirming one or more characteristics of data that may be discovered in the source data.

In at least one of the various embodiments, a classifier may communicate with an external information source to confirm that a discovered identifier corresponds to a particular feature. For example, a classifier may be arranged to confirm that certain 9 digit strings may be associated with an employee, customer, patient, or the like.

Further, in at least one of the various embodiments, a classifier may be arranged to communicate with external information sources to obtain additional information. For example, if a classifier is arranged to discover and extract a features related to an employee identifier, it may also be arranged to communicate with an external database to obtain more information about the employee. Some or all of the information provided by external information source may be added to the raw data graph.

At decision block 2008, in at least one of the various embodiments, if the classifier has discovered and/or extracted feature information, control may flow to block 2010; otherwise, control may be returned to a calling process.

At block 2010, in at least one of the various embodiments, some or all of the feature information discovered and/or extracted by the classifier may be added to the raw data graph. In at least one of the various embodiments, features and/or information discovered during classification may result in modification to the concept graph. Accordingly, classification may determine additional properties of a raw data field that indicate that it is or is not associated with a particular concept. For example, during classification, if a string value initially interpreted as a person's name is reclassified as a business name, this may cause the raw data be associated with a different concept, such as, a company rather than an employee or person. Further, if additional properties/features are added to the raw data graph based on classification, one or more indices may be updated to incorporate that information. Next, control may be returned to a calling process.

Figure 21:
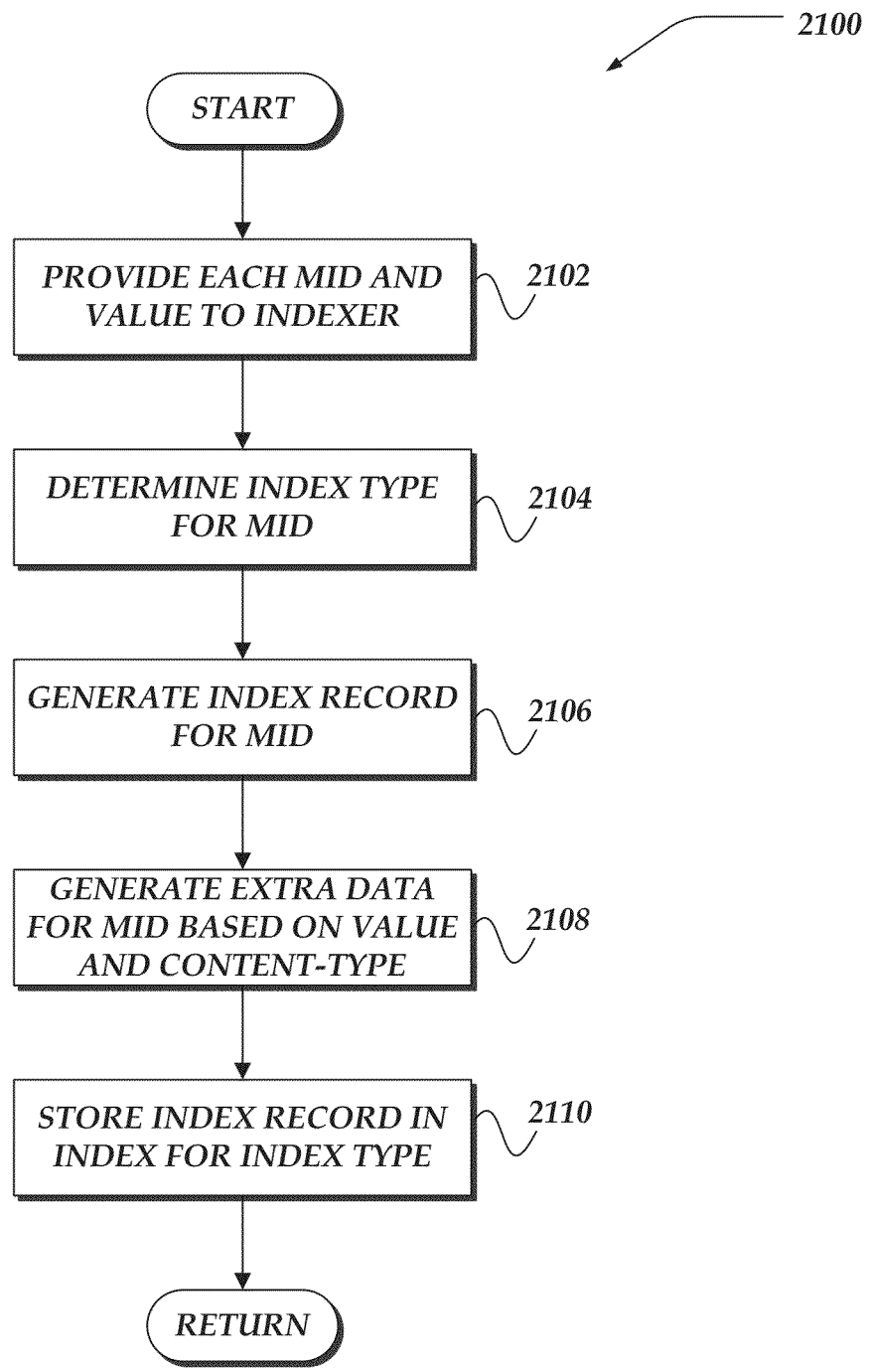
FIG. 21 shows an overview flowchart for a process for responding to queries for information from a dynamic semantic model with multiple indices in accordance with at least one of the various embodiments.

FIG. 21 shows an overview flowchart for process 2100 for indexing information for a dynamic semantic model with multiple indices in accordance with at least one of the various embodiments. After a start block, at block 2102, MIDs and their corresponding value may be provided to an indexer, such as, indexer 319. In at least one of the various embodiments, the MIDs provided to the indexer may comprise information such as that described for MID 1012 or MID 1026 as described in conjunction with FIG. 10.

At block 2104, in at least one of the various embodiments, the index type for the MID may be determined. In at least one of the various embodiments, the raw data graph element mapped to the MID may include a feature information that represents the content-type of the underlying value of concept instance that is represented by the MID. Accordingly, in at least one of the various embodiments, the indexer may be arranged to select an index from among a plurality of indices for indexing the MID. In at least one of the various embodiments, the index may be selected based on configuration information that includes a mapping of content-type values to indices. For example, in at least one of the various embodiments, MIDs representing text concept instances and/or values may be associated with an n-gram index. Likewise, in at least one of the various embodiments, MIDs representing temporal (date/time) concept instances and/or value may be associated with a temporal index. And, in at least one of the various embodiments, MIDs representing geo-spatial concept instances and/or values may be associated with a geo-spatial index.

Further, in at least one of the various embodiments, multiple indices may be optimized for the same content-type but each have different configurations. Also, in some cases, in at least one of the various embodiments, more than one index may be selected for a single MID. For example, there may be multiple time-based indices each having different time-range/time-bucket configurations. In some cases, for example, one time-based/temporal index may be configured to provide optimized indexing for days (24 hour periods) while another may be configured to provide optimized indexing time values in terms of seconds.

Likewise, in at least one of the various embodiments, there may be multiple n-gram indices each optimized for a one or more particular types of n-grams. For example, some indices may be arranged to be optimized to support different languages and/or character sets.

At block 2106, in at least one of the various embodiments, the indexer may generate an index record that corresponds to the MID. In at least one of the various embodiments, index records, such as those displayed in FIGS. 11-13 may be generated for MIDs that are provided to the indexer. In at least one of the various embodiments, the actual format of the index record may vary depending on the implementation of the index. In at least one of the various embodiments, each index record may include a model graph for determining where the concept instance represented by the MID fits within the structure of the semantic model. Also, each index record may include the actual index keys. Such as, n-grams for n-gram values, time/data for temporal values, geo-spatial location information for geo-spatial values, or the like.

In at least one of the various embodiments, multiple index records may be generated for each MID depending on the value of the MID and the type of index. Accordingly, in at least one of the various embodiments, if a value of concept instance represented by a MID includes multiple n-grams, multiple index records may be generated to correspond with each n-gram. For example, if a MID represents a movie title concept instance of "Nightmare in Georgia," the indexer may generate index records for n-grams such as, nightmare, Georgia, 'nightmare in georgia', and so on.

As discussed above, MIDs representing concept instances having temporal values may be indexed based on the time value. And, MIDs representing concept instances having geo-spatial values may be indexed based on the geo-spatial information.

Further, in at least one of the various embodiments, the indexer may extract the keys and values from the MIDs for storing in the index record. Likewise, in some embodiments, information for retrieving the underlying source data record may be determined from the MID and added to the index record. In at least one of the various embodiments, this information may be a URI, or other form of identifier that may be employed for locating and retrieving the original source data.

In at least one of the various embodiments, since a mapping engine may produce multiple MIDs from the same source data record, one or more generated index records may include a location/retrieval information for the same source data record.

At block 2108, in at least one of the various embodiments, one or more extra data values may be generated based on the value and content-type of the concept instance that corresponds to the MID. As discussed above, extra data may be one or more additional columns of data that include additional data that may be related to the MID. In at least one of the various embodiments, some extra data may be common to index records for the different types of indices, such as, age of record, and so on. Also, in at least one of the various embodiments, extra data columns may vary depending on the type of index. Further, although not shown in FIGS. 11-13 or discussed in detail otherwise, index records may include one or more columns for bookkeeping information, administration, access control, implementation details, or the like, for supporting the operation of an index.

Further, in at least one of the various embodiments, n-gram index records may include extra data for representing other n-grams values that may have various relationships, semantic or otherwise, to the n-grams and/or concept instance values of the MID. In at least one of the various embodiments, the extra data may include words from other languages that having the same or similar meanings, At block 2110, in at least one of the various embodiments, the generated index record may be added to an index that may be selected based on the index type. In at least one of the various embodiments, as mentioned above, the selected index may be optimized for the content-type of the concept instance value of the MID. Accordingly, the selected index may be indexed the generated index record using one or more well-known techniques for indexing the content-type of the concept instance associated with the MID.

Also, in at least one of the various embodiments, the indexer may generate one or more records for one or more indices. In at least one of the various embodiments, a forward index such as, forward index 1600 in FIG. 16 may be generated. Accordingly, in at least one of the various embodiments, such indexes may be arranged to map various resource and/or concept instances to MIDs. In at least one of the various embodiments, other indices such as join indices used for relating resources and/or concepts to other resources and/or concepts may also be generated. For example, a join index may be arranged to associate movie resources with actor resources. Likewise, for example, another join index may be arranged to map an actor concept instance with the movie concept instance he or she is associated with, and so on.

In at least one of the various embodiments, configuration rules may be applied to determine the particular join indices and inverted indices that may be generated. In at least one of the various embodiments, the indexer may be arranged to recognize relationships between resources/MIDs that may benefit from a join index. Accordingly, in at least one of the various embodiments, the indexer may monitor the number of resources that have the same parent, if this number exceeds a defined threshold the indexer may be arranged to generate a join index or an inverted index for mapping the parent resources to its children and vice-versa. In at least one of the various embodiments, the list of candidate join indexes, if any, may be presented to a user is a graphical user interface. Accordingly, the user may be enabled to accept or decline the join indexes. Next, control may be returned to calling process.

Figure 22:
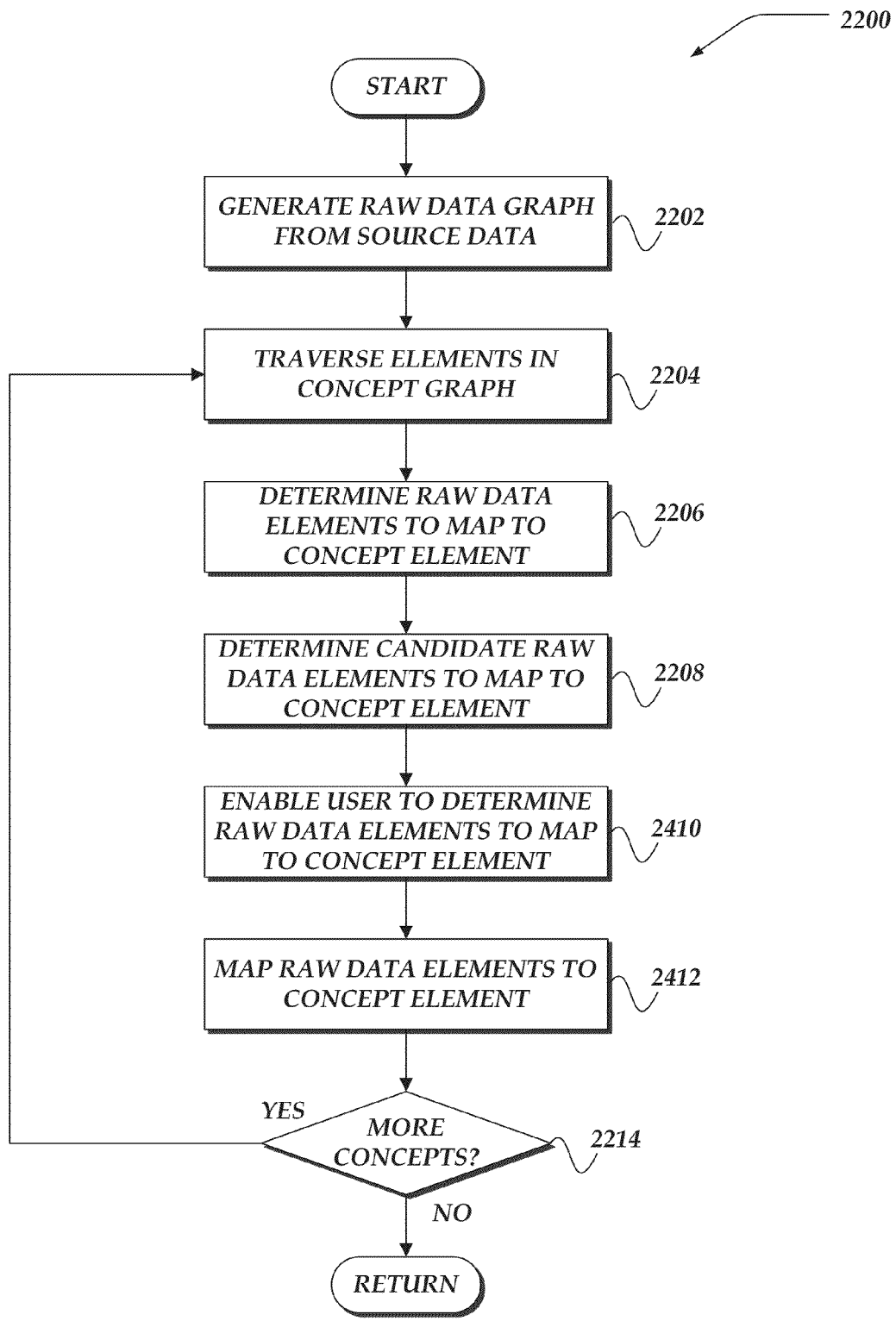
FIG. 22 shows an overview for a process for mapping raw data graph elements to a concept graph in accordance with at least one of the various embodiments.

FIG. 22 shows an overview for process 2200 for mapping raw data graph elements to a concept graph in accordance with at least one of the various embodiments. After a start block, at block 2202, a raw data graph may be generated. As discussed above, the raw data graph may be generated by an ingestion engine. In at least one of the various embodiments, the raw data graph may represent the structure of the source data. Also, in at least one of the various embodiments, the raw data graph elements may include various annotations generated by the one or more classifiers that may have processed to the source data and/or payload during ingestion.

At block 2204, in at least one of the various embodiments, elements in the concept graph may be traversed by a mapping engine. In at least one of the various embodiments, the concept graph may have been determined and/or selected prior to the initiation of this mapping process. Accordingly, concept graph may include one or more concept nodes and concept properties that have already been defined. However, in at least one of the various embodiments, the mapping engine must perform the actions to map some or all of the raw data graph elements to some or all of the elements in the concept graph.

At block 2206, in at least one of the various embodiments, one or more raw data elements from the raw data graph may be determined to map to the concept element. The mapping engine may be arranged to include one or more rules for identifying raw data elements that should be automatically mapped to the concept graph element. In some embodiments, the concept graph element may be associated with one or more rules and/or conditions that may be applied or tested against elements of the raw data graph. Accordingly, in some embodiments, if a raw data element meets enough of the rules/conditions it may be automatically mapped to the concept graph element.

At block 2208, in at least one of the various embodiments, one or more raw data elements from the raw data graph may be determined to be candidates for mapping to the concept graph element. In at least one of the various embodiments, the mapping engine may be arranged to include one or more rules for identifying raw data elements that should be identifies as candidates for mapping to the concept graph element. In some embodiments, the concept graph element may be associated with one or more rules and/or conditions that may be applied or tested against elements of the raw data graph. Accordingly, in some embodiments, if a raw data element meets enough of the rules/conditions it may be determined to be a candidate for mapping to the concept graph element.

In at least one of the various embodiments, the list of candidate raw data graph elements, if any, may be presented to a user is a graphical user interface. Accordingly, the user may be enabled to accept or decline the raw data elements that are suggested for mapping.

At block 2210, in at least one of the various embodiments, process 2200 may enable a user to manually identify raw data elements for mapping to the concept graph element. Thus, in at least one of the various embodiments, a user may employ a user to select one or more raw data graph elements for mapping to the concept graph elements. In some embodiments, the concept graph element may include one or more constraints that may limit how elements may be mapped. For example, in at least one of the various embodiments, a concept graph may prevent have constraints defined to prevent geographic address fields from being mapped to a telephone field.

At block 2212, in at least one of the various embodiments, the determined and/or selected raw data graph elements may be mapped to the concept graph element. In at least one of the various embodiments, a mapping node may be generated and stored in a system graph. The mapping node include properties that define how the fields in the raw data elements are mapped to the properties in the concept graph elements.

At decision block 2214, in at least one of the various embodiments, if there are more concept graph elements that need to be mapped to the raw data graph elements, control may loop back to block 2204; otherwise, control may be returned to a calling process.

Figure 23:
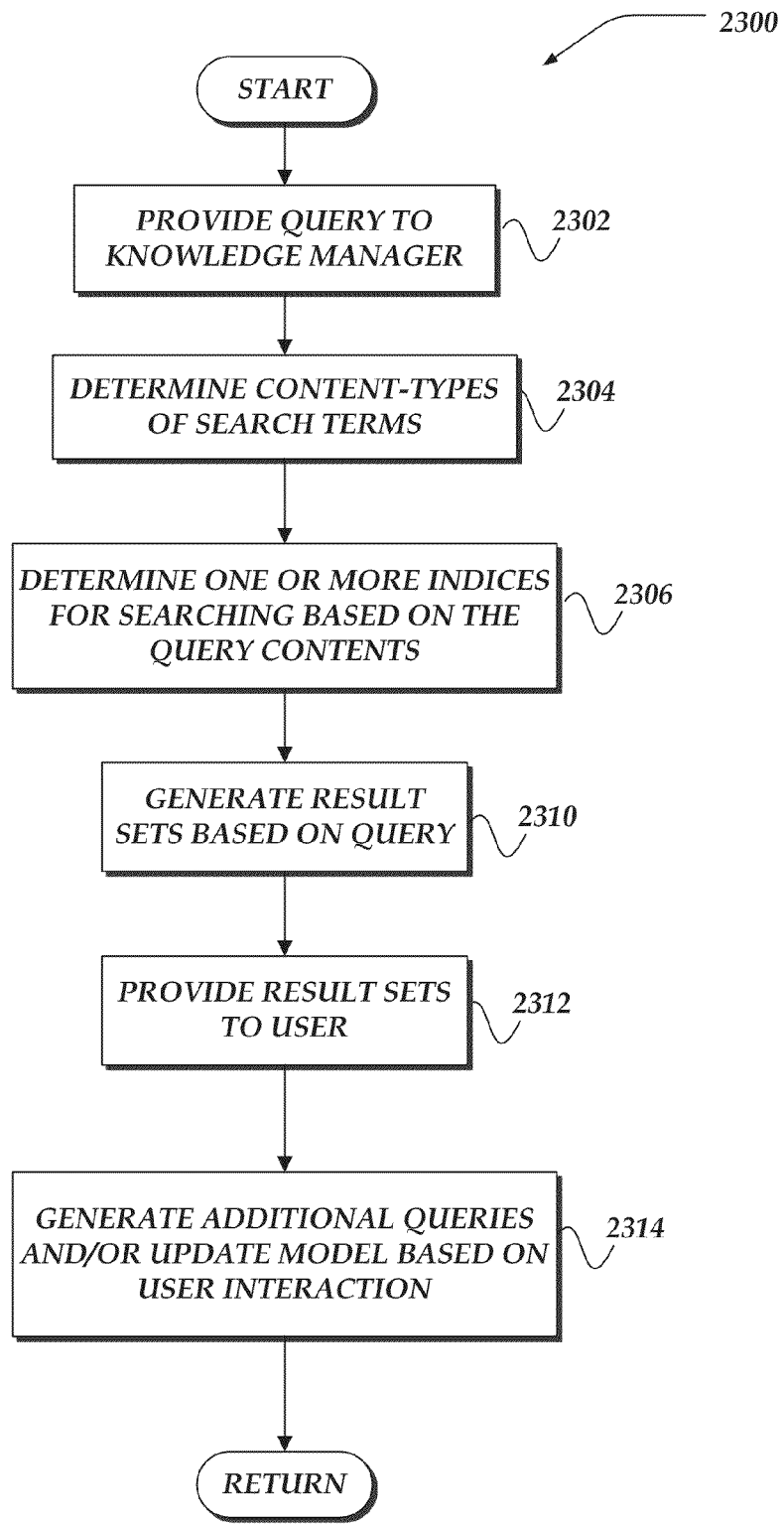
FIG. 23 shows an overview flowchart for a process for responding to queries for information from a dynamic semantic model with multiple indices in accordance with at least one of the various embodiments.

FIG. 23 shows an overview flowchart for process 2300 for responding to queries for information from a dynamic semantic model with multiple indices in accordance with at least one of the various embodiments. After a start block, at block 2302, a query may be provided to a knowledge manager, such as, knowledge manager application 321. A user may provide the query using one or more interfaces, such as, command-line interfaces, GUI interfaces, web interfaces (e.g., REST APIs), or the like.

In at least one of the various embodiments, the query may be comprised of one or more well-known query languages, such as, SQL, Contextual Query Language (CQL), XQuery, SPARQL Protocol and RDF Query Language (SPARQL), custom query languages, or the like. Also, the query may be comprised of a search terms such as, for a search engine, rather than a formal query language.

At block 2304, in at least one of the various embodiments, the knowledge manager may determine the content types for the one or more of the search terms includes in the query. In at least one of the various embodiments, the query contents may explicitly call-out or define the content type for a query. In other embodiments, the knowledge manager may determine the content-type of query terms based on their values. Accordingly, the knowledge manager may be arranged to employ one or more techniques such as pattern matching for determining the content-type of query terms included in the query.

In at least one of the various embodiments, if the knowledge manager may be unable to determine a content-type for a query terms, it may treat the content-type as a default value, such as 'text/plain', or the like. In at least one of the various embodiments, the default content-type may be set using configuration information.

For example, in at least one of the various embodiments, a query string of 'smith 1998' that is provided may result in the term 'smith' being characterized as an n-gram type, such as, 'text/plain' and '1998' being characterized as temporal data type.

At block 2306, in at least one of the various embodiments, one or more indices may be selected based on the content-type of the query terms. In at least one of the various embodiments, if the query contents includes multiple query terms of different content-types, multiple indices, at least one for each content-type, may be selected.

At block 2308, in at least one of the various embodiments, the query terms may be used to generate one or more result sets from the selected indices. Each query term may be provided to at least one of the selected indices. Accordingly, results for each query term may be produced from the indices.

In at least one of the various embodiments, queries may include terms for grouping, clustering, or segmenting results. Also, in at least one of the various embodiments, groups, segments, and/or clusters may be defined to become concepts that may be added to the semantic model. For example, in at least one of the various embodiments, if a query includes terms for segmenting a population (e.g., actors) by age, such as, child, youth, young adult, adult, and so on, the concept 'age group' may be introduced to the semantic model.

At block 2310, in at least one of the various embodiments, the result sets may be provided to user and/or other application that provided the query. In at least one of the various embodiments, may be in the form of a text file, XML file, or the like. In some embodiments, the result set may provide in the form of a graphical report. In at least one of the various embodiments, the graphical reports may be interactive enabling users to interactively select and/or view relationships between the entities included in the result set.

At block 2312, in at least one of the various embodiments, additional queries may be generated and/or the model may be updated based on user interactions. In at least one of the various embodiments, a user may generate additional queries from the results of a previous query. In at least one of the various embodiments, results from a query may display one or more concepts that are related to the concept identified by the previous query. Accordingly, in at least one of the various embodiments, a user may query for the related concepts. In at least one of the various embodiments, a user interface may display an interactive list of the results, enabling to user to execute addition queries by selecting items in the list.

Further, in at least one of the various embodiments, queries may be produce initial results lists that include different concepts in the same list. For example, a search for "John Smith" may match a Movie Actor concept and a Person concept. Thus, in this example, if the user further queries (by selecting) the matching Movie Actor concept additional results may be generated related from the movie database information. This may include a list of movies "John Smith" was involved in, what his roles were, and so on. Likewise, in this example, if a user selected the Person concept corresponding to the "John Smith" an additional query may return personal information about "John Smith", such as, email address, age, height, weight, and so on.

Further, in at least one of the various embodiments, the results of a query may also list source data records that include the query terms. Accordingly, a user may be enabled to retrieve the source data records corresponding to the query rather than being limited to the information included in the concept graph.

In at least one of the various embodiments, the indices may be updated based on query contents, result sets, or user feedback. In at least one of the various embodiments, the knowledge manager may be arranged to automatically highlight semantic information that may be associated with the entities/resources that may have been involved directly or indirectly in queries.

In at least one of the various embodiments, if a query includes grouping terms (e.g., group by, clustering, segmenting, or the like), the groups that were included in the result set may be added to the semantic model. In at least one of the various embodiments, the groups may be used to define new concepts that may be added to the semantic model. For example, if a query includes terms for segmenting a population (e.g., actors) by age, such as, child, youth, young adult, adult, and so on, the concept 'age group' may be introduced to the semantic model. In this example, the actor concept may be augmented by adding the 'age group' concept to the actors with a value of child, youth, young adult, adult, and so on, for each actor. Accordingly, in at least one of the various embodiments, MIDs for the concept instances discovered by the query may be generated and indexed similarly as the MIDs determined during ingestion.

In at least one of the various embodiments, the query may explicitly include command language to add groups, clusters, or segments, to the semantic model. Such command language may include defining a name for the concept associated with the group. In at least one of the various embodiments, the knowledge manager may automatically identify query results that may be added to the semantic model as concepts. For example, in some embodiments the knowledge manager may automatically generate concepts based on the results of repeated group-by queries.

In at least one of the various embodiments, the knowledge manager may recognize that one or more sub-set of results may be related, accordingly, knowledge manager may generate concepts that capture the relationships. For example, Further, in at least one of the various embodiments, indices may be updated to reflect user feedback. In at least one of the various embodiments, user feedback may include additional source data that may be ingested. Accordingly, such user feedback may result in additional MIDs being added to the indices.

In at least one of the various embodiments, queries (e.g., searches) may be saved by adding them to the semantic model. Accordingly, a search node may be generated and added to the graph database. In at least one of the various embodiments, the search node may include properties representing the result types that may be returned executing the query. In some embodiments, these properties may be explicitly expressed in the query language of the search. In other cases, the properties may be determined based on the actual concept element and/or raw data elements that are return in the result set.

Figure 24:
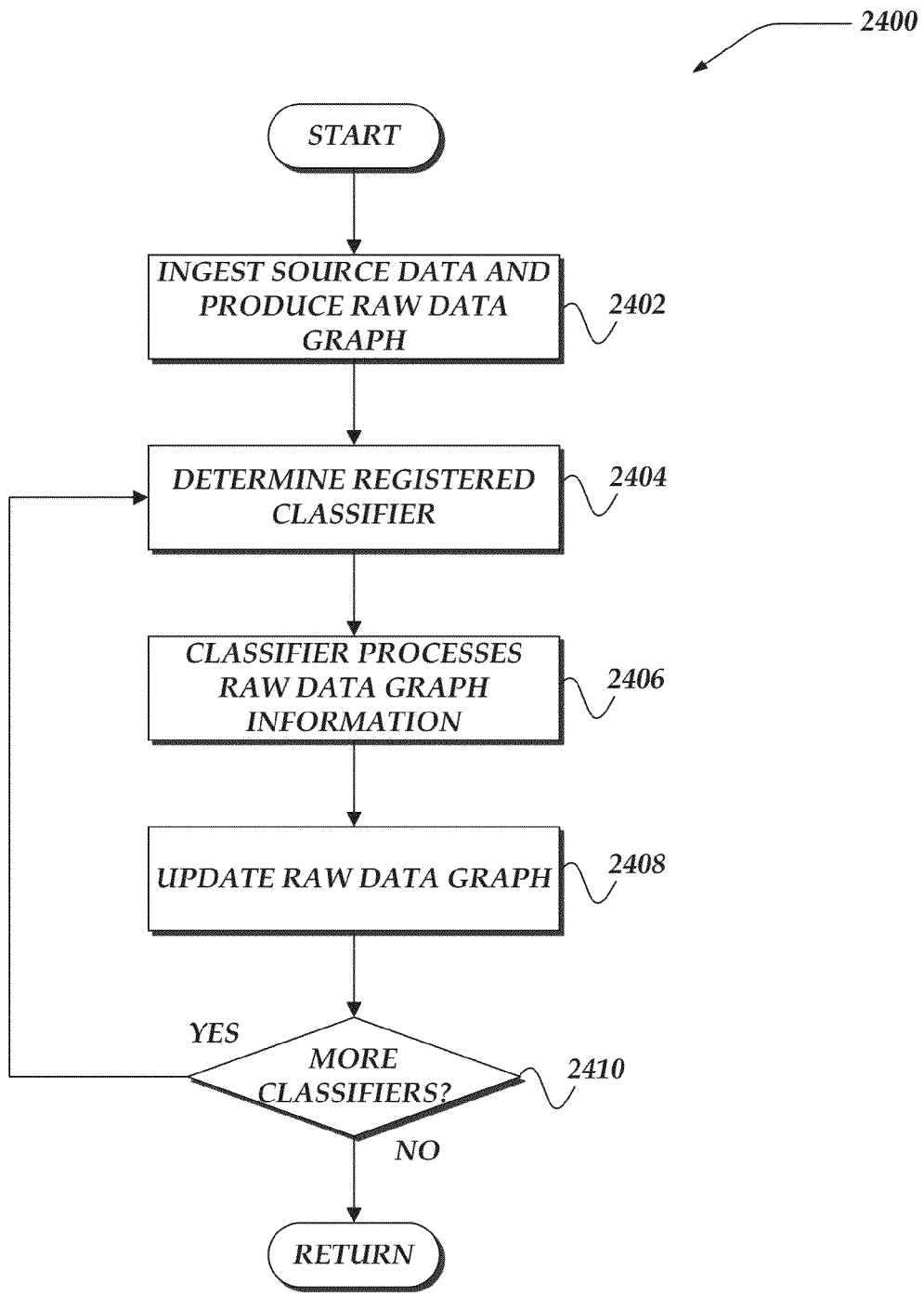
FIG. 24 shows an overview flowchart for a process for performing non-pipelined actions to classify information for a dynamic semantic model in accordance with at least one of the various embodiments.

FIG. 24 shows an overview flowchart for process 2400 for ingesting source data for a dynamic semantic model in accordance with at least one of the various embodiments. After a start block, at block 2402, an ingestion engine may ingest the source data producing an initial raw data graph.

At block 1904, in at least one of the various embodiments, a classifier may be determined from the set of registered classifiers.

In at least one of the various embodiments, classifiers may be arranged to discover and/or extract feature information from the source data and/or the payload itself. In some embodiments, one or more classifiers may be specifically designed to process particular types of source data. These classifiers may be looking for particular fields and/or patterns in the source data that may be identified as features.

In at least one of the various embodiments, classifiers may be arranged to perform an initial operation to determine if the payload includes information that may be relevant to them. Accordingly, in some embodiments, classifiers may be arranged to test values in the payload meta-data, such as, record type, content-type, source, age/date, owner, or the like, to determine if the classifier may further process the data. In at least one of the various embodiments, a classifier that may be arranged to process a source record from a particular data source, such as a particular patient/clinical record database, may accept or decline an invitation to process the payload based on the values of one or more meta-data values. Likewise, in at least one of the various embodiments, a classifier may be designed to process older source records (e.g., that may be provided in an older format). Accordingly, such a classifier may be arranged to accept older records that may be older than a defined date and deny records that may be newer than the defined date.

At block 2406, in at least one of the various embodiments, the classifier may process the raw data graph information and the source data. In at least one of the various embodiments, classifiers that discover and extract one or more features from the source data may add them to the payload.

At block 2408, in at least one of the various embodiments, the feature information that was determined and/or discovered by the classifier may be added to fields and/or elements of the raw data graph as annotations to provide more information about the raw graph element.

At decision block 2410, in at least one of the various embodiments, if there are more classifiers available to process the payload, control may loop back to block 2404; otherwise, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed is:

1. A method for improving the performance of managing data over a network by using a processor device, included with one or more network computers, to perform actions, comprising:

providing source data from one or more separate data sources to the one or more network computers;

providing a plurality of particular types of indices that are separate and optimized for one or more different content-types, wherein the particular types of indices include one or more of n-gram indices, temporal indices, or geo-spatial indices;

generating a raw data graph from the source data, wherein the structure of the raw data graph is based on the structure of the source data;

mapping one or more elements of the raw data graph to a concept graph;

generating one or more concept instances based on at least the concept graph, the raw data graph, and the source data;

generating one or more model-identifiers (MIDs) that correspond to the one or more concept instances, wherein the one or more MIDs include at least a path in the concept graph and one or more value keys that correspond to one or more portions of the source data;

indexing values from the source data that correspond to the one or more MIDs in the one or more indices that are selected from the plurality of indices based on a content-type of the source data that is associated with the one or more MIDs; and responsive to a query, generating a result set that includes one or more result MIDs based on one or more indices of the plurality of indices, wherein a content-type of at least one portion of the query is employed to select the one or more indices used to generate the result set.

2. The method of claim 1, wherein indexing the values from the source data that correspond to the one or more MIDs further comprises, generating one or more index records that include semantic equivalents of at least a value of the one or more MIDs.

3. The method of claim 1, wherein the plurality of indices, further includes, at least one index that is optimized for a content-type of text, at least one index that is optimized for a content-type of time, and at least one index that is optimized for a content-type of geo-spatial information.

4. The method of claim 1, wherein generating the raw data graph, further comprises:

providing the source data to one or more classifiers that are identified on a classifier registration list; and modifying one or more raw data graph elements based on actions performed by the one or more classifiers.

5. The method of claim 1, further comprising, computing one or more raw data graph elements based on the source data, wherein the value of the one or more raw data graph elements is absent from the source data.

6. The method of claim 1, wherein mapping the one or more elements of the raw data graph to a concept graph, further comprises, determining one or more raw data graph elements based on one or more annotations that one or more classifiers added to the one or more raw data graph elements.

7. The method of claim 1, further comprising, generating one or more additional queries based on at least a portion of the result set.

8. The method of claim 1, further comprising, selecting the concept graph based on one or more ontologies.

9. A system for managing data over a network, comprising:
a modeling system server computer, comprising:
a transceiver that is operative to communicate over the network;
a memory that is operative to store at least instructions; and
a processor device that executes instructions that perform actions, including:
providing source data to the modeling system server computer from at least one separate data source;
providing a plurality of particular types of indices that are separate and optimized for one or more different content-types, wherein the particular types of indices include one or more of n-gram indices, temporal indices, or geo-spatial indices;
generating a raw data graph from the source data, wherein the structure of the raw data graph is based on the structure of the source data;
mapping one or more elements of the raw data graph to a concept graph;
generating one or more concept instances based on at least the concept graph, the raw data graph, and the source data;
generating one or more model-identifiers (MIDs) that correspond to the one or more concept instances, wherein the one or more MIDs include at least a path in the concept graph and one or more value keys that correspond to one or more portions of the source data;
indexing values from the source data that correspond to the one or more MIDs in one or more indices that are selected from the plurality of indices based on a content-type of the source data that is associated with the one or more MIDs; and
responsive to a query, generating a result set that includes one or more result MIDs based on one or more indices of the plurality of indices, wherein a content-type of at least one portion of the query is employed to select the one or more indices used to generate the result set; and
a source data server computer, comprising:
a transceiver that is operative to communicate over the network;
a memory that is operative to store at least instructions; and
a processor device that executes instructions that perform actions, including:
providing the source data to the modeling system server computer.

10. The system of claim 9, wherein indexing the values from the source data that correspond to the one or more MIDs further comprises, generating one or more index records that include semantic equivalents of at least a value of the one or more MIDs.

11. The system of claim 9, wherein the plurality of indices, further includes, at least one index that is optimized for a content-type of text, at least one index that is optimized for a content-type of time, and at least one index that is optimized for a content-type of geo-spatial information.

12. The system of claim 9, wherein generating the raw data graph, further comprises:
providing the source data to one or more classifiers that are identified on a classifier registration list; and
modifying one or more raw data graph elements based on actions performed by the one or more classifiers.

13. The system of claim 9, wherein the modeling system server processor device executes instructions that perform actions further comprising, computing one or more raw data graph elements based on the source data, wherein the value of the one or more raw data graph elements is absent from the source data.

14. The system of claim 9, wherein mapping the one or more elements of the raw data graph to a concept graph, further comprises, determining one or more raw data graph elements based on one or more annotations that one or more classifiers added to the one or more raw data graph elements.

15. The system of claim 9, wherein the modeling system server processor device executes instructions that perform actions further comprising, generating one or more additional queries based on at least a portion of the result set.

16. The system of claim 9, wherein the modeling system server processor device executes instructions that perform actions further comprising, selecting the concept graph based on one or more ontologies.

17. A processor readable non-transitory storage media that includes instructions for improving the performance of managing data over a network, wherein execution of the instructions by a processor device performs actions, comprising:
providing source data to one or more network computers from one or more separate data sources;
providing a plurality of particular types of indices that are separate and optimized for one or more different content-types, wherein the particular types of indices include one or more of n-gram indices, temporal indices, or geo-spatial indices;
generating a raw data graph from the source data, wherein the structure of the raw data graph is based on the structure of the source data;
mapping one or more elements of the raw data graph to a concept graph;
generating one or more concept instances based on at least the concept graph, the raw data graph, and the source data;
generating one or more model-identifiers (MIDs) that correspond to the one or more concept instances, wherein the one or more MIDs include at least a path in the concept graph and one or more value keys that correspond to one or more portions of the source data;
indexing values from the source data that correspond to the one or more MIDs in one or more indices that are selected from the plurality of indices based on a content-type of the source data that is associated with the one or more MIDs; and
responsive to a query, generating a result set that includes one or more result MIDs based on one or more indices of the plurality of indices, wherein a content-type of at least one portion of the query is employed to select the one or more indices used to generate the result set.

18. The media of claim 17, wherein indexing the values from the source data that correspond to the one or more MIDs further comprises, generating one or more index records that include semantic equivalents of at least a value of the one or more MIDs.

19. The media of claim 17, wherein the plurality of indices, further includes, at least one index that is optimized for a content-type of text, at least one index that is optimized for a content-type of time, and at least one index that is optimized for a content-type of geo-spatial information.

20. The media of claim 17, wherein generating the raw data graph, further comprises:
providing the source data to one or more classifiers that are identified on a classifier registration list; and
modifying one or more raw data graph elements based on actions performed by the one or more classifiers.

21. The media of claim 17, further comprising, computing one or more raw data graph elements based on the source data, wherein the value of the one or more raw data graph elements is absent from the source data.

22. The media of claim 17, wherein mapping the one or more elements of the raw data graph to a concept graph, further comprises, determining one or more raw data graph elements based on one or more annotations that one or more classifiers added to the one or more raw data graph elements.

23. The media of claim 17, further comprising, generating one or more additional queries based on at least a portion of the result set.

24. A network computer for managing data over a network, comprising:
a transceiver that communicates over the network;
a memory that stores at least instructions; and
a processor device that executes instructions that perform actions, including:
providing source data to the network computer from one or more separate data sources;
providing a plurality of particular types of indices that are separate and optimized for one or more different content-types, wherein the particular types of indices include one or more of n-gram indices, temporal indices, or geo-spatial indices;
generating a raw data graph from the source data, wherein the structure of the raw data graph is based on the structure of the source data;
mapping one or more elements of the raw data graph to a concept graph;
generating one or more concept instances based on at least the concept graph, the raw data graph, and the source data;
generating one or more model-identifiers (MIDs) that correspond to the one or more concept instances, wherein the one or more MIDs include at least a path in the concept graph and one or more value keys that correspond to one or more portions of the source data;
indexing values from the source data that correspond to the one or more MIDs in one or more indices that are selected from the plurality of indices based on a content-type of the source data that is associated with the one or more MIDs; and
responsive to a query, generating a result set that includes one or more result MIDs based on one or more indices of the plurality of indices, wherein a content-type of at least one portion of the query is employed to select the one or more indices used to generate the result set.

25. The network computer of claim 24, wherein indexing the values from the source data that correspond to the one or more MIDs further comprises, generating one or more index records that include semantic equivalents of at least the value of the one or more MIDs.

26. The network computer of claim 24, wherein the plurality of indices, further includes, at least one index that is optimized for a content-type of text, at least one index that is optimized for a content-type of time, and at least one index that is optimized for a content-type of geo-spatial information.

27. The network computer of claim 24, wherein generating the raw data graph, further comprises:
providing the source data to one or more classifiers that are identified on a classifier registration list; and
modifying one or more raw data graph elements based on actions performed by the one or more classifiers.

28. The network computer of claim 24, wherein the processor device executes instructions that perform actions further comprising, computing one or more raw data graph elements based on the source data, wherein the value of the one or more raw data graph elements is absent from the source data.

29. The network computer of claim 24, wherein mapping the one or more elements of the raw data graph to a concept graph, further comprises, determining one or more raw data graph elements based on one or more annotations that one or more classifiers added to the one or more raw data graph elements.

30. The network computer of claim 24, wherein the processor device executes instructions that perform actions further comprising, generating one or more additional queries based on at least a portion of the result set.

* * * * *